US012707458B2

(12) United States Patent
Do et al.

(10) Patent No.: US 12,707,458 B2
(45) Date of Patent: Aug. 11, 2026

(54) SYSTEMS AND METHODS FOR COOPERATIVE UPLINK TRANSMISSION

(71) Applicant: Telefonaktiebolaget LM Ericsson (publ), Stockholm (SE)

(72) Inventors: Hieu Do, Järfälla (SE); Talha Khan, Santa Clara, CA (US); Kittipong Kittichokechai, Järfälla (SE); Miguel Lopez, Aachen (DE); Jeong Hun Kim, Kanata (CA)

(73) Assignee: Telefonaktiebolaget LM Ericsson (publl), Stockholm (SE)

( * ) Notice: Subject to any disclaimer, the term of this patent is extended or adjusted under 35 U.S.C. 154(b) by 422 days.

(21) Appl. No.: 18/266,934

(22) PCT Filed: Dec. 18, 2020

(86) PCT No.: PCT/SE2020/051243

§ 371 (c)(1),
(2) Date: Jun. 13, 2023

(87) PCT Pub. No.: WO2022/131984

PCT Pub. Date: Jun. 23, 2022

(65) Prior Publication Data

US 2024/0064734 A1 Feb. 22, 2024

(51) Int. Cl.
*H04W 76/02* (2009.01)
*H04W 72/1268* (2023.01)

(52) U.S. Cl.
CPC ................................ *H04W 72/1268* (2013.01)

(58) Field of Classification Search
CPC ..... H04L 27/0008; H04L 27/02; H04L 27/10; H04L 5/0026; H04L 5/0032;

(Continued)

(56) References Cited

U.S. PATENT DOCUMENTS 9,173,110 B2 * 10/2015 Lim ...................... H04L 5/0048
10,531,442 B2 * 1/2020 Park ...................... H04W 72/21

(Continued)

FOREIGN PATENT DOCUMENTS

WO WO-2022087948 A1 * 5/2022 .......... H04L 5/0051

OTHER PUBLICATIONS

Ericsson, "R1-1907398: IMT-2020 self-evaluation: mMTC coverage, data rate, latency & battery life," 3GPP TSG-RAN1 Meeting #97, May 13-17, 2019, Reno, Nevada, 7 pages.

(Continued)

*Primary Examiner* — Phuc H Tran

(74) *Attorney, Agent, or Firm* — Withrow & Terranova, PLLC

(57) ABSTRACT

Systems and methods are disclosed herein for coordinated uplink transmission. In one embodiment, a method performed by a wireless communication device comprises obtaining a configuration of a plurality of sets of resources for cooperative uplink transmission. The plurality of sets of resources comprises N sets of resources that are mapped to N possible data elements that can be communicated by a cooperative uplink transmission by a group of two or more wireless devices including the wireless communication device. N is an integer number that is greater than or equal to 2. The method further comprises transmitting a transmission using at least a subset of a particular set of resources from among the N sets of resources that is mapped to a particular data element from among the N possible data elements that is to be communicated by the wireless communication device for the cooperative uplink transmission.

20 Claims, 12 Drawing Sheets

(58) Field of Classification Search
CPC ...... H04L 5/0044; H04L 5/0094; H04W 4/70; H04W 72/121; H04W 72/1268
See application file for complete search history.

(56) References Cited

U.S. PATENT DOCUMENTS

| | | | | |
|---|---|---|---|---|
| 2012/0057535 | A1* | 3/2012 | Zhang | H04W 72/27 370/329 |
| 2017/0318615 | A1* | 11/2017 | Ou | H04B 7/026 |
| 2020/0287668 | A1* | 9/2020 | Shi | H04L 1/1887 |
| 2023/0370229 | A1* | 11/2023 | Xiao | H04B 7/0404 |
| 2023/0397194 | A1* | 12/2023 | Wang | H04W 72/121 |

OTHER PUBLICATIONS

Huawei, "RP-191010: Rel-17 work scope on uplink coverage enhancements for NR and LTE," 3GPP RAN #84, Jun. 3-6, 2019, Newport Beach, California, 5 pages.

International Search Report and Written Opinion for International Patent Application No. PCT/SE2020/051243, mailed Oct. 29, 2021, 10 pages.

* cited by examiner

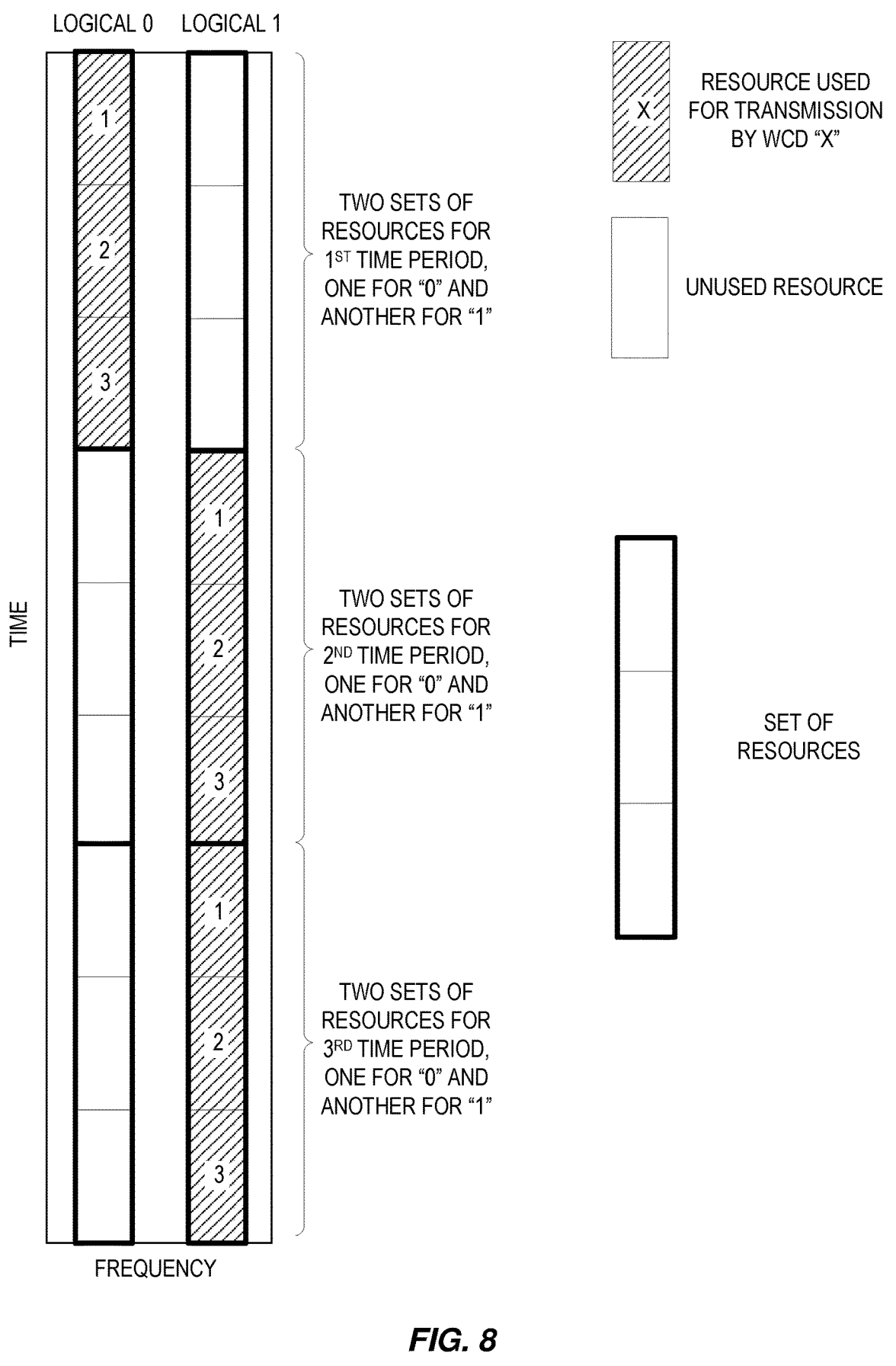

LOGICAL 0 LOGICAL 1

1 2 3

1 2 3

1 2 3

TIME

FREQUENCY

TWO SETS OF RESOURCES FOR 1ST TIME PERIOD, ONE FOR “0” AND ANOTHER FOR “1”

TWO SETS OF RESOURCES FOR 2ND TIME PERIOD, ONE FOR “0” AND ANOTHER FOR “1”

TWO SETS OF RESOURCES FOR 3RD TIME PERIOD, ONE FOR “0” AND ANOTHER FOR “1”

X RESOURCE USED FOR TRANSMISSION BY WCD “X”

UNUSED RESOURCE

SET OF RESOURCES

*FIG. 8*

SYSTEMS AND METHODS FOR COOPERATIVE UPLINK TRANSMISSION

This application is a 35 U.S.C. § 371 national phase filing of International Application No. PCT/SE2020/051243, filed Dec. 18, 2020, the disclosure of which is incorporated herein by reference in its entirety.

TECHNICAL FIELD

Systems and method are disclosed herein that relate to uplink transmission in a wireless communications system.

BACKGROUND

In the past years, wireless communication has been expanding from human-centric communication (e.g., communication using phones) to also include machine-type communication (MTC) (e.g., communication with sensing devices deployed in houses, streets, factories, and so on). This trend is being driven by numerous applications in the Internet of Things (IoT) domain making things "smarter" as in smart homes, smart cities, smart factories, and smart grids.

Wireless connectivity for IoT or massive machine-type communications (mMTC) devices can be provided by several technologies such as those based on Bluetooth, Zigbee, LoRa, Sigfox, as well as cellular technology. Among these options, the cellular technology (i.e., cellular technology developed by the Third Generation Partnership Project (3GPP)) has many benefits in terms of Quality of Service (QoS), reliability, latency, security, and coverage.

So far, 3GPP has offered several solutions for mMTC in its technical specification releases. Starting in Release 13 (Rel-13), two parallel tracks for MTC have been offered, referred to as Long Term Evolution MTC (LTE-M) and Narrowband IoT (NB-IoT). LTE-M targets a class of devices which is less capable than normal smartphones by limiting the operation bandwidth to a maximum of six LTE resource blocks. The supported peak rate of LTE-M in Rel-13 is 1 Megabits per second (Mbps) in both uplink and downlink. NB-IoT, on the other hand, targets even less capable devices by limiting the operation to a maximum of one LTE resource block. As a result, NB-IoT in Rel-13 supports a peak data rate as low as 27 kilobits per second (kbps) on the downlink and 60 kbps on the uplink. In subsequent releases, both LTE-M and NB-IoT have been improved to support higher peak data rates.

A typical IoT device is powered by a small battery (e.g., coin cell) and features a low-complexity design with limited computational capabilities, low cost, and infrequent data communications. A common characteristic of a large class of IoT devices such as, e.g., sensors, smart meters, and wearables is the limited power availability for communication as compared to some other types of traditional wireless devices like smart phones, tablets, or devices mounted on vehicles. Therefore, prolonging the device battery life has been a key design consideration for mMTC. The technical solutions offered by 3GPP have been designed to cater to these characteristics of the IoT devices. For example, NB-IoT was introduced with the requirement of achieving a ten years life operating on a 5 Watt-hours (Wh) battery, assuming a daily delivery of a 200 byte uplink message followed by a 20 byte downlink message (see R1-1907398). In order to meet these requirements, several power saving mechanisms were considered in the initial design and later updated to further evolve NB-IoT in the following releases. Some of the notable power saving mechanisms are:

- Extended Discontinuous Reception (eDRX): eDRX allows power saving by allowing the device to not monitor the network for scheduling for a pre-configured period of time.
- Power Saving Mode (PSM): PSM allows the device to sleep without having to re-attach to the network when it wakes up.
- Wake-Up-Signal (WUS): WUS allows the device to determine when the next scheduling grant/paging will occur without having to blindly search and decode, thus conserving power.
- Early Data Transmission (EDT): EDT allows transmission of small data packet in Msg3 of the random access procedure to save power and reduce latency.
- Power Class 6 (PC6): PC6 further restricts the maximum transmit power of the device to 14 decibel-milliwatts (dBm), allowing a trade-off between power with coverage.

With the evolution of semiconductor and device technologies, a new class of IoT devices, hereafter interchangeably referred to as self-powered or zero power (ZP) or zero-energy (ZE) devices, is emerging. As the name implies, a ZP device (e.g., a ZP IoT device) is a device that is powered by harvesting power from ambient energy sources. Thus, a ZP device usually is not powered by, or powered solely by, a battery. Instead, it harvests energy from ambient energy sources such as light, motion, Radio Frequency (RF) signals, heat, etc. A ZP device is equipped with or connected to an energy harvesting device, which typically consists of a transducer, circuits for power conversion and power management, and energy storage. Energy harvesting devices come in various flavors. For example, some devices may harvest and combine energy from several sources whereas others may rely on a single kind of energy source. The potential applications of energy-harvesting devices include smart meters, smart sensors, wearables, etc.

There are several advantages of using a ZP device as compared to a battery-powered device. First, replenishing energy from the environment helps reduce both the energy costs and the carbon footprint. Second, manual intervention for battery replacements and disposal is not needed, which considerably reduces the maintenance cost of ZP devices. Third, ZP devices are designed to have extremely low complexity, which further reduces the device cost.

However, ZP devices also come with certain limitations. Typically, depending on the environment, the power availability at a ZP device can be scarce, intermittent, and unreliable. This is different from a battery-powered device where the power is assumed to be available throughout the device lifetime. Furthermore, a ZP device may also have limited transceiver capabilities to enable ultra-low power operation. This is because, on one hand, the amount of power available to an energy harvesting device usually depends on the power density in the ambient environment, which can be very low, often in the order of a few tens or hundreds of microwatts per cubic centimeter. On the other hand, the energy requirements for wireless communications are typically higher, especially if the application requires communication ranges in the order of tens of meters or larger. In this case, transmit powers in the order of at least 1 milliwatt (mW) could be necessary. It follows that the ZP devices must accumulate sufficient energy in order to be able to operate. In addition, microcontroller units and other electronics that may be present in the ZP device typically require voltages much larger that the input voltage delivered by the transducer. Hence, the output voltage must often be boosted and regulated. Thus, ZP devices generally require duty-cycled operation and are unable to operate if the stored energy is insufficient or if the power management circuitry is unable to deliver to the radio or application circuitry a voltage exceeding a minimum threshold.

Radio Frequency (RF) transceiver circuitry is often the module that consumes most power in a ZP device such as a sensor node. In turn, the Power Amplifier (PA) is one of the most power-hungry blocks in a RF transceiver. The design of a PA involves trade-offs such as linearity versus power efficiency and spectral efficiency versus power efficiency. The highest power efficiency is typically attained at the peak output power (i.e., at its Peak Envelope Power (PEP)) and decreases as the output power decreases. Constant envelope signals allow the PA to be operated at its PEP, resulting in high power efficiency. On the other hand, multicarrier modulations such as Orthogonal Frequency Division Multiplexing (OFDM) exhibit large amplitude variations. Hence, to transmit multi-carrier signals, the PA must have high linearity to avoid distorting the signal and must operate at an average power well below the PEP, resulting in low power efficiency. Although there are some advanced signal processing techniques such as envelope tracking to improve multicarrier PA efficiency, these technologies are not well suited to low complexity/low cost ZP devices.

Due to the low-power nature of many IoT or mMTC devices, signals sent by these devices are often received at the serving base station at very low signal-to-noise-and-interference ratios (SINR). This phenomenon limits the communication range between the devices and the base station. In other words, the uplink in mMTC is the bottleneck for network coverage. The problem is even more severe for many ZP devices due to the very limited energy they can harvest and/or store. Note that this is not the case for the downlink since the base station can afford much higher transmit power than the devices.

In the NB-IoT technology, one solution to the above coverage problem is to allow an IoT device to repeat an uplink transmission multiple times, possibly with increased power as well. The repetition will effectively increase the received SINR at the base station. While such a solution can also be considered for ZP devices, its applicability is far more limited because a ZP device may not have enough energy to perform multiple transmissions within the latency budget of the message. Besides, increasing the transmit power is not always a viable solution since it requires more complex power management circuits in the devices. In fact, for many low-cost ZP devices, it is expected that only a single transmit power level can be applied.

SUMMARY

Systems and methods are disclosed herein for coordinated uplink transmission. In one embodiment, a method performed by a wireless communication device comprises obtaining a configuration of a plurality of sets of resources for cooperative uplink transmission. The plurality of sets of resources comprises N sets of resources that are mapped to N possible data elements that can be communicated by a cooperative uplink transmission by a group of two or more wireless devices including the wireless communication device. N is an integer number that is greater than or equal to 2. The method further comprises transmitting a transmission using at least a subset of a particular set of resources from among the N sets of resources that is mapped to a particular data element from among the N possible data elements that is to be communicated by the wireless communication device for the cooperative uplink transmission. In this manner, a group of wireless communication devices are enabled to provide a cooperative uplink transmission having improved Signal-to-Interference plus Noise Radio (SINR) at the receiver. This particularly advantages for low-power wireless communication devices such as, for example, Zero Power (ZP) wireless communication devices.

In one embodiment, the N sets of resources are different sets of resources.

In one embodiment, each of the N sets of resources consists of a single resource, and transmitting the transmission using the at least a subset of the particular set of resources comprises transmitting the transmission using the single resource in the particular set of resources.

In one embodiment, each of the N sets of resources consists of two or more resources, and transmitting the transmission using the at least a subset of the particular set of resources comprises transmitting the transmission using a resource from among the two or more resources in the particular set of resources. In one embodiment, the method further comprises selecting the resource from among the two or more resources in the particular set of resources to be used for transmitting the transmission. In one embodiment, selecting the resource from among the two or more resources in the particular set of resources to be used for transmitting the transmission comprises selecting the resource from among the two or more resources in the particular set of resources to be used for transmitting the transmission based on a device identifier (ID) of the wireless communication device. In another embodiment, selecting the resource from among the two or more resources in the particular set of resources to be used for transmitting the transmission comprises randomly selecting the one of the two or more resources in the particular set of resources to be used for transmitting the transmission.

In one embodiment, the two or more resources in the particular set of resources comprise different time resources, or different frequency resources, or both different time resources and different frequency resources. In one embodiment, the two or more resources in the particular set of resources comprise different subcarriers in an Orthogonal Frequency Division Multiplexing (OFDM) system, or different OFDM symbol periods in the OFDM system, or both different subcarriers and different OFDM symbol periods in the OFDM system.

In one embodiment, the N possible data elements are two possible bit values, the N sets of resources are two sets of resources consisting of a first set of resources mapped to a first bit value from among the two possible bit values and a second set of resources mapped to a second bit value from among the two possible bit values, the first set of resources consists of a first set of frequency resources over a period of time, and the second set of resources consists of a second set of frequency resources over the period of time.

In one embodiment, the N possible data elements are two possible bit values, the N sets of resources are two sets of resources consisting of a first set of resources mapped to a first bit value from among the two possible bit values and a second set of resources mapped to a second bit value from among the two possible bit values, the first set of resources consists of a first set of time resources on a first frequency resource over a period of time, and the second set of resources consists of a second set of time resources on a second frequency resource over the period of time, where the first and second frequency resources are different frequency resources.

In one embodiment, the N possible data elements are two possible bit values, the N sets of resources are two sets of resources consisting of a first set of resources mapped to a first bit value from among the two possible bit values and a second set of resources mapped to a second bit value from among the two possible bit values, and the first set of resources and the second set of resource are defined such that the wireless communication device operates in accordance with a Frequency Shift Keying (FSK) transmission scheme with a frequency deviation that is a multiple of a subcarrier spacing of a multi-carrier based system in which the cooperative uplink transmission is made.

In one embodiment, the transmission uses single carrier modulation where a modulation symbol has a same duration as one or more multi-carrier symbols of a multi-carrier system in which the coordinated uplink transmission is made.

In one embodiment, the N sets of resources consist of two sets of resources, where the two sets of resources are the same set of resources, and the N possible data elements consist of a first bit value represented by transmitting on the same set of resources and a second bit value represented by not transmitting on the same set of resources. In one embodiment, the particular data element that is to be communicated by the wireless communication device for the cooperative uplink transmission is the first bit value, and transmitting the transmission comprises transmitting the transmission using at least a subset of the same set of resources responsive to the particular data element that is to be communicated by the wireless communication device for the cooperative uplink transmission being the first bit value. In one embodiment, in regard to transmitting the transmission, the wireless communication device operates in accordance with an On-Off Keying (OOK) transmission scheme, and the same set of resources is defined such that an on-signal that corresponds to the transmission transmitted using the at least a subset of the same set of resources responsive to the particular data element that is to be communicated by the wireless communication device for the cooperative uplink transmission being the first bit value has the same duration as one or more multi-carrier symbols of a multi-carrier system in which the cooperative uplink transmission is made.

In one embodiment, the N possible data elements are N unique messages.

In one embodiment, the N possible data elements are two possible bit values, and the N sets of resources are two sets of resources.

In one embodiment, the transmission is a predefined signal, the predefined signal being a predefined physical signal or a predefined physical channel. In one embodiment, the predefined signal is modulated but not channel coded. In one embodiment, the predefined signal is modulated and channel coded. In one embodiment, the predefined signal is a predefined bit sequence.

In one embodiment, the transmission comprises multiple repetitions of a predefined signal. In one embodiment, the multiple repetitions comprises a number of repetitions that is either network configured or based on one or more parameters related to the wireless communication device.

In one embodiment, two or more instances of the particular set of resources are configured periodically over a time period, and transmitting the transmission comprises transmitting the transmission using the at least a subset of a particular instance of the particular set of resources.

In one embodiment, obtaining the configuration of the plurality of sets of resources for cooperative uplink transmission comprises receiving the configuration of the plurality of sets of resources for cooperative uplink transmission from a network node.

In one embodiment, obtaining the configuration of the plurality of sets of resources for cooperative uplink transmission comprises receiving the configuration of the plurality of sets of resources for cooperative uplink transmission from memory or from an associated Subscriber Identity Module (SIM) card.

In one embodiment, the plurality of sets of resources are configured periodically in time.

In one embodiment, each of the plurality of sets of resources comprises one or more resources, and each resource of the one or more resources comprises: (a) a time resource, (b) a frequency resource, (c) a spatial resource, (d) a code resource, or a combination of any two or more of (a)-(d).

In one embodiment, obtaining the configuration comprises obtaining information about one or more parameters to be used for transmitting the transmission. In one embodiment, the one or more parameters comprise: (i) modulation and coding scheme, (ii) antenna port, (iii) sequence to be used, or (iv) a combination of any two or more of (i)-(iii).

In one embodiment, the method further comprises repeating the step of transmitting a transmission in multiple time periods. In one embodiment, the set of possible values consists of a logical "0" and a logical "1," and repeating the step of transmitting a transmission in multiple time periods communicates a multiple bit sequence.

Corresponding embodiments of a wireless communication device are also disclosed. In one embodiment, a wireless communication device for cooperative uplink transmission is adapted to obtain a configuration of a plurality of sets of resources for cooperative uplink transmission. The plurality of sets of resources comprises N sets of resources that are mapped to N possible data elements that can be communicated by a cooperative uplink transmission by a group of two or more wireless devices including the wireless communication device. N is an integer number that is greater than or equal to 2. The wireless communication device is further adapted to transmit a transmission using at least a subset of a particular set of resources from among the N sets of resources that is mapped to a particular data element from among the N possible data elements that is to be communicated by the wireless communication device for the cooperative uplink transmission.

In another embodiment, a wireless communication device for cooperative uplink transmission comprises one or more transmitters and processing circuitry associated with the one or more transmitters. The processing circuitry is configured to cause the wireless communication device to obtain a configuration of a plurality of sets of resources for cooperative uplink transmission. The plurality of sets of resources comprises N sets of resources that are mapped to N possible data elements that can be communicated by a cooperative uplink transmission by a group of two or more wireless devices including the wireless communication device. N is an integer number that is greater than or equal to 2. The processing circuitry is further configured to cause the wireless communication device to transmit a transmission using at least a subset of a particular set of resources from among the N sets of resources that is mapped to a particular data element from among the N possible data elements that is to be communicated by the wireless communication device for the cooperative uplink transmission.

Corresponding embodiments of a non-transitory computer readable medium storing instructions executable by processing circuitry of a wireless communication device are also disclosed. By execution of the instructions by the processing circuitry, the wireless communication device is operable to obtain a configuration of a plurality of sets of resources for cooperative uplink transmission. The plurality of sets of resources comprises N sets of resources that are mapped to N possible data elements that can be communicated by a cooperative uplink transmission by a group of two or more wireless devices including the wireless communication device. N is an integer number that is greater than or equal to 2. By execution of the instructions by the processing circuitry, the wireless communication device is further operable to transmit a transmission using at least a subset of a particular set of resources from among the N sets of resources that is mapped to a particular data element from among the N possible data elements that is to be communicated by the wireless communication device for the cooperative uplink transmission.

Embodiments of a method performed by a network node are also disclosed. In one embodiment, a method performed by a network node comprises providing, to a plurality of wireless communication devices, information that configures the plurality of wireless communication devices for cooperative uplink transmission. The information comprises information that defines a plurality of sets of resources for cooperative uplink transmission. The plurality of sets of resources comprise N sets of resources that are mapped to N possible data elements that can be communicated by a cooperative uplink transmission, where N is an integer number that is greater than or equal to 2. In one embodiment, the method further comprises detecting a cooperative uplink transmission based on signals received in at least one of the N sets of resources.

In one embodiment, the method further comprises determining the N possible data elements that can be communicated by a cooperative uplink transmission from the plurality of wireless communication devices. In one embodiment, determining the N possible data elements that can be communicated by a cooperative uplink transmission from the plurality of wireless communication devices comprises determining the plurality of wireless communication devices to be configured for cooperative uplink transmission based on: (a) one or more tasks performed by the plurality of wireless communication devices, or (b) geographical locations of the plurality of wireless communication devices, or (c) energy or power availability profile of the plurality of wireless communication devices, or (d) device identity, or (e) a combination of any two or more of (a)-(d). Determining the N possible data elements that can be communicated by a cooperative uplink transmission from the plurality of wireless communication devices further comprises determining the N possible data elements that can be communicated by a cooperative uplink transmission from the plurality of wireless communication devices based on: (i) the one or more tasks performed by the plurality of wireless communication devices, or (ii) operating sensitivity or capability of the plurality of wireless communication devices, or (iii) radio communication capabilities of the plurality of wireless communication devices, or (iv) a combination of any two or more of (i)-(iii).

In one embodiment, the N sets of resources are different sets of resources.

In one embodiment, each of the N sets of resources consists of a single resource, and detecting the cooperative uplink transmission comprises detecting the cooperative uplink transmission based on signals received on the single resource of at least one of the N sets of resources.

In one embodiment, each of the N sets of resources consists of two or more resources. In one embodiment, different wireless communication devices from among the plurality of wireless communication devices transmit on different ones of the two or more resources in one of the N sets of resources for the cooperative uplink transmission. In one embodiment, for each set of resources of the N sets of resources, the two or more resources in the N set of resources comprise different time resources, or different frequency resources, or both different time resources and different frequency resources. In one embodiment, for each set of resources of the N sets of resources, the two or more resources in the set of resources comprise different subcarriers in an OFDM system, or different OFDM symbol periods in the OFDM system, or both different subcarriers and different OFDM symbol periods in the OFDM system.

In one embodiment, the N possible data elements are two possible bit values, the N sets of resources are two sets of resources consisting of a first set of resources mapped to a first bit value from among the two possible bit values and a second set of resources mapped to a second bit value from among the two possible bit values; and the first set of resources consists of a first set of frequency resources over a period of time, and the second set of resources consists of a second set of frequency resources over the period of time.

In one embodiment, the N possible data elements are two possible bit values, the N sets of resources are two sets of resources consisting of a first set of resources mapped to a first bit value from among the two possible bit values and a second set of resources mapped to a second bit value from among the two possible bit values, the first set of resources consists of a first set of time resources on a first frequency resource over a period of time, and the second set of resources consists of a second set of time resources on a second frequency resource over the period of time, where the first and second frequency resources are different frequency resources.

In one embodiment, a transmission from each of at least a subset of the plurality of wireless communication device for the cooperative uplink transmission uses single carrier modulation where a modulation symbol has a same duration as one or more multi-carrier symbol of a multi-carrier system in which the coordinated uplink transmission is made.

In one embodiment, the N possible data elements are two possible bit values, the N sets of resources are two sets of resources consisting of a first set of resources mapped to a first bit value from among the two possible bit values and a second set of resources mapped to a second bit value from among the two possible bit values, and the first set of resources and the second set of resource are defined such that the plurality of wireless communication devices operate in accordance with a FSK transmission scheme with a frequency deviation that is a multiple of a subcarrier spacing of an multi-carrier based system in which the cooperative uplink transmission is made.

In one embodiment, the N sets of resources consist of two sets of resources, where the two sets of resources are the same set of resources, and the N possible data elements consist of a first bit value represented by transmitting on the same set of resources and a second bit value represented by not transmitting on the same set of resources. In one embodiment, in regard to the cooperative uplink transmission, the information configures the plurality of wireless communication devices to operate in accordance with an OOK transmission scheme, and the same set of resources is defined such that on-signals that corresponds to transmissions transmitted by the plurality of wireless communication devices using at least a subset of the same set of resources responsive to a particular data element that is to be communicated for the cooperative uplink transmission being the first bit value has the same duration as one or more multi-carrier symbol of a multi-carrier system in which the cooperative uplink transmission is made.

In one embodiment, the N possible data elements are N unique messages.

In one embodiment, the N possible data elements are two possible bit values, and the N sets of resources are two sets of resources.

In one embodiment, the cooperative uplink transmission comprises a predefined signal transmitted by at least a subset of the plurality of wireless communication devices in a particular set of resources that is mapped to one of the N possible data elements that is communicated by the detected cooperative uplink transmission, the predefined signal being a predefined physical signal or a predefined physical channel.

In one embodiment, detecting the cooperative uplink transmission comprises detecting that a received energy level on the one of the N sets of resources is greater than a threshold energy level.

In one embodiment, detecting the cooperative uplink transmission comprises detecting the cooperative uplink transmission based on a weighted average of received energy levels across two or more of the N sets of resources.

In one embodiment, the predefined signal is modulated but not channel coded. In another embodiment, the predefined signal is modulated and channel coded.

In one embodiment, the predefined signal is a predefined bit sequence.

Corresponding embodiments of a network node are also disclosed. In one embodiment, a network node is adapted to provide to a plurality of wireless communication devices information that configures the plurality of wireless communication devices for cooperative uplink transmission. The information comprises information that defines a plurality of sets of resources for cooperative uplink transmission. The plurality of sets of resources comprise N sets of resources that are mapped to N possible data elements that can be communicated by a cooperative uplink transmission, where N is an integer number that is greater than or equal to 2. The network node is adapted to detect a cooperative uplink transmission based in signals received in at least one of the N sets of resources.

In another embodiment, a network node comprises processing circuitry configured to cause the network node to provide to a plurality of wireless communication devices information that configures the plurality of wireless communication devices for cooperative uplink transmission. The information comprises information that defines a plurality of sets of resources for cooperative uplink transmission. The plurality of sets of resources comprise N sets of resources that are mapped to N possible data elements that can be communicated by a cooperative uplink transmission, where N is an integer number that is greater than or equal to 2. The processing circuitry is further configured to cause the network node to detect a cooperative uplink transmission based in signals received in at least one of the N sets of resources.

Corresponding embodiments of a non-transitory computer readable medium storing instructions executable by processing circuitry of a network node are also disclosed. By execution of the instructions by the processing circuitry, the network node is operable to provide to a plurality of wireless communication devices information that configures the plurality of wireless communication devices for cooperative uplink transmission. The information comprises information that defines a plurality of sets of resources for cooperative uplink transmission. The plurality of sets of resources comprise N sets of resources that are mapped to N possible data elements that can be communicated by a cooperative uplink transmission, where N is an integer number that is greater than or equal to 2. By execution of the instructions by the processing circuitry, the network node is further operable to cause the network node to detect a cooperative uplink transmission based in signals received in at least one of the N sets of resources.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates an alternative resource allocation to that shown in FIG. 7 in accordance with another example embodiment;

DETAILED DESCRIPTION

Figure 1:
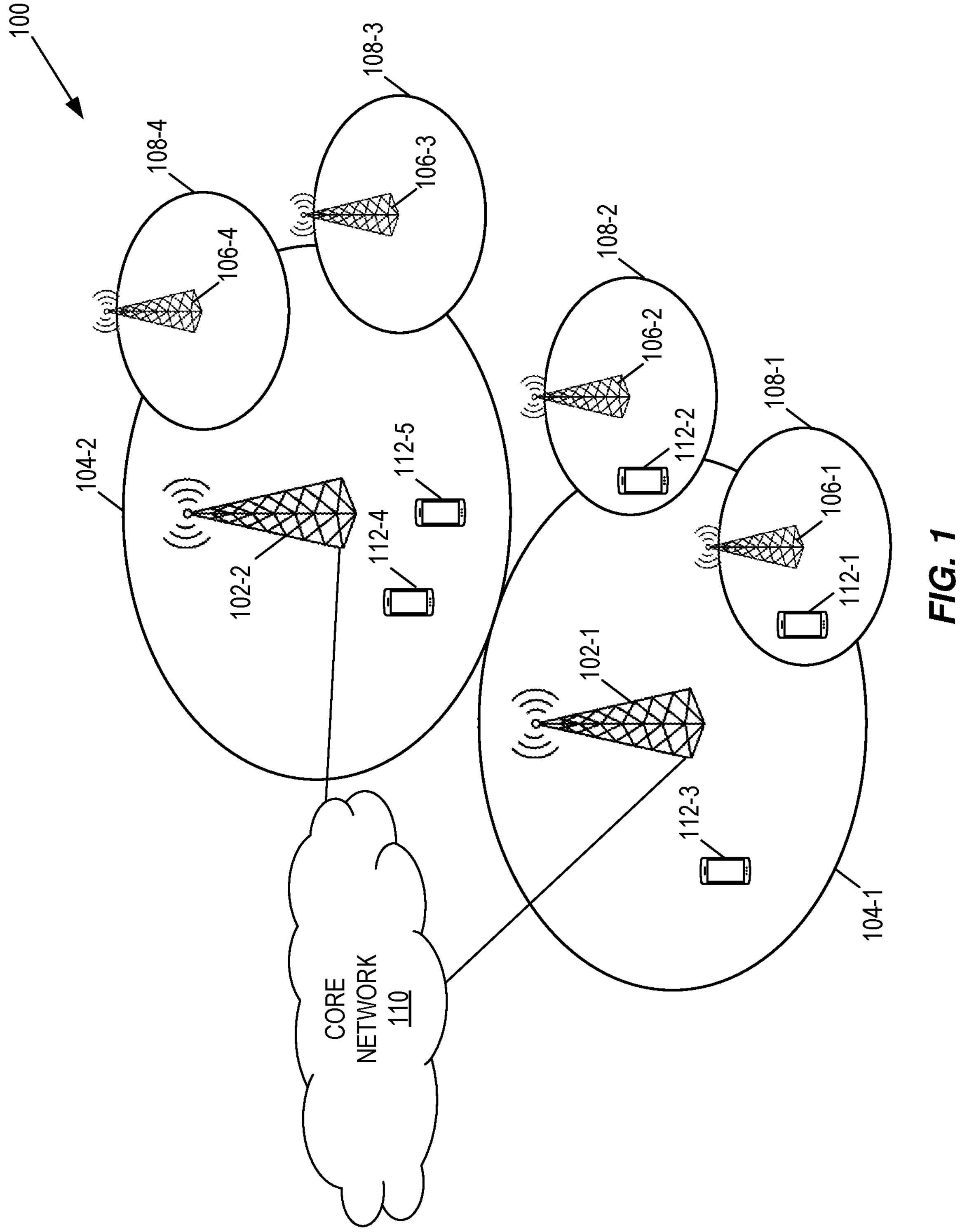
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, an Internet of Things (IoT) device, and a Zero Power (ZP) device (e.g., a ZP IoT device). Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Cooperative Uplink (UL) Transmission: As used herein, a "cooperative uplink transmission" or "cooperative UL transmission" is a group of two or more uplink transmissions from a group of two or more wireless communication devices (e.g., User Equipments (UEs)), respectively, of a same message (e.g., a same signal, which may be a predefined signal) using the same resource that is mapped to a data element (e.g., message or bit) to be communicated by the cooperative uplink transmission or using different resources in the same set of resources that is mapped to the data element to be communicated by the cooperative uplink transmission. Note that, in order to cover both of these scenarios, the description herein refers to a cooperative uplink transmission as using a same set of resources mapped to the data element to be communicated by the cooperative uplink transmission, where this set of resources may consist of a single resource (in which case the wireless communication devices transmit on the same single resource) or consist of multiple resources (in which case at least some of the wireless communication devices transmit on different resources in the same set of resources). Further note that the mapping between the sets of resources and the respective data elements may, more specifically, be defined as either a mapping of the data elements to the respective sets of resources or vice versa.

Resource: As used herein, a "resource" is a time, and/or frequency, and/or code resource, and/or spatial resource (e.g., beam). Note that, in regard to frequency and time, the term "resource" is not limited to a single frequency or a single time period. In this regard, if a resource includes multiple frequencies, these frequencies are contiguous in the frequency domain. Likewise, if a resource includes multiple time periods, these time periods are contiguous in the time domain. When the network node (e.g., base station) which is to receive the cooperative uplink transmission uses a subcarrier-based Radio Access Technologies (RATs), such as e.g., Orthogonal Frequency Division Multiplexing (OFDM), a resource may include one or more subcarriers in one or more time periods (e.g., one or more symbol periods such as, e.g., one or more OFDM symbol periods as perceived by the network node). For example, if using a Third Generation Partnership Project (3GPP) RAT such as New Radio (NR), a resource may include one or more subcarriers (as perceived by the network node) and/or one or more time periods (e.g., one or more slots, one or more OFDM symbols, or the like).

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods for cooperative uplink transmission are disclosed herein. Embodiments of these systems and methods provide a solution to the uplink coverage bottleneck problem for ZP devices by enabling multiple ZP devices to transmit the same message, potentially using the same signal, using the same set of (pre-)configured uplink resources. In some embodiments, each set of configured uplink resources includes a single resource, and the multiple ZP devices transmit the same message on the same single resource. In some other embodiments, each set of configured uplink resources includes multiple resources, and the multiple ZP devices transmit the same message using the same set of resources, where at least some of the multiple ZP devices transmit on different resources in the same set of resources. As a result, the base station receives an aggregated signal with higher Signal to Interference plus Noise Ratio (SINR) than the SINR from the individual transmissions. The solution is based on the observation that while the ZP devices are very limited in their transceiver capabilities, they are often very cheap and therefore can be deployed with redundancy. Therefore, multiple ZP devices observing the same source of information can be controlled to cooperatively send the same message.

Embodiments of the present disclosure enhance the coverage of wireless communication with ZP devices without requiring the ZP devices to increase transmit power and/or without requiring the ZP devices to repeat a transmission multiple times or requiring the ZP devices to repeat the transmission a fewer number of times. Furthermore, the problem caused by some ZP devices not having enough energy to perform a transmission when needed (e.g., due to insufficient accumulated energy) is alleviated.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC); however, the present disclosure is not limited thereto. In this example, the RAN includes base stations 102-1 and 102-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC and in the EPS is referred to as the EPC. The base stations 102 (and optionally the low power nodes 106) are connected to the core network 110.

The base stations 102 and the low power nodes 106 provide service to wireless communication devices (WCDs) 112-1 through 112-5 in the corresponding cells 104 and 108. The WCDs 112-1 through 112-5 are generally referred to herein collectively as WCDs 112 and individually as WCD 112. In the preferred embodiments disclosed herein, at least some of the WCDs 112 are ZP devices such as, e.g., ZP IoT devices.

Now, systems and methods are disclosed in which a set of WCDs 112 (e.g., a set of ZP devices) implicitly cooperate in uplink transmissions, thereby improving the quality of the received signals at the network side and consequently improving the communication range or network coverage. This is referred to herein as cooperative uplink transmission. Although embodiments are sometimes described herein in the context of ZP devices, the solutions described herein can be advantageously applied to other types of WCDs. Further, the solutions described herein can be applied to any type of wireless network such as, e.g., a cellular network such as, e.g., a LTE network, a 5G NR network, or a next generation of cellular network.

Also note that the solutions described herein can be combined in various meaningful ways with existing mechanisms for coverage enhancement for mMTC such as repetition of uplink transmissions.

In some embodiments, the proposed solutions make use of the fact that ZP devices are low-cost and, therefore, can be deployed with redundancy. For example, multiple sensors can be deployed in the same floor of a building to monitor the temperature or humidity or the lighting condition in that floor. Similarly, multiple sensors can be deployed in the same area to monitor the water level of a river or a sea or to count the number of vehicles in a parking lot. With such a redundancy in deployment, multiple ZP devices may end up sending the same message since they observe the same source of information. This is especially true for binary sources such as whether a gate is open or closed, whether a machine is running or has stopped, whether a switch is on or off, and so on. For other types of sources, however, there can be differences in the observations of the devices which are observing the same source. For example, different thermal sensors may detect different temperatures of the same object depending on their distances to the object or different wind sensors in wind farm may detect different wind velocities depending on their particular position in the farm. In any case, the output value of the ZP devices observing/measuring the same source are often quantized into a finite set of values and it is likely that there are multiple devices outputting the same value at a time. For example, water level of a river can be quantized into ranges of 10 centimeters (cm) each, and all levels in a range can be rounded off to the middle value of the range. Therefore, without loss of generality, it can be assumed that messages sent by ZP devices belong to a finite set. The solutions described herein are applicable to any such finite-message sets.

Figure 2:
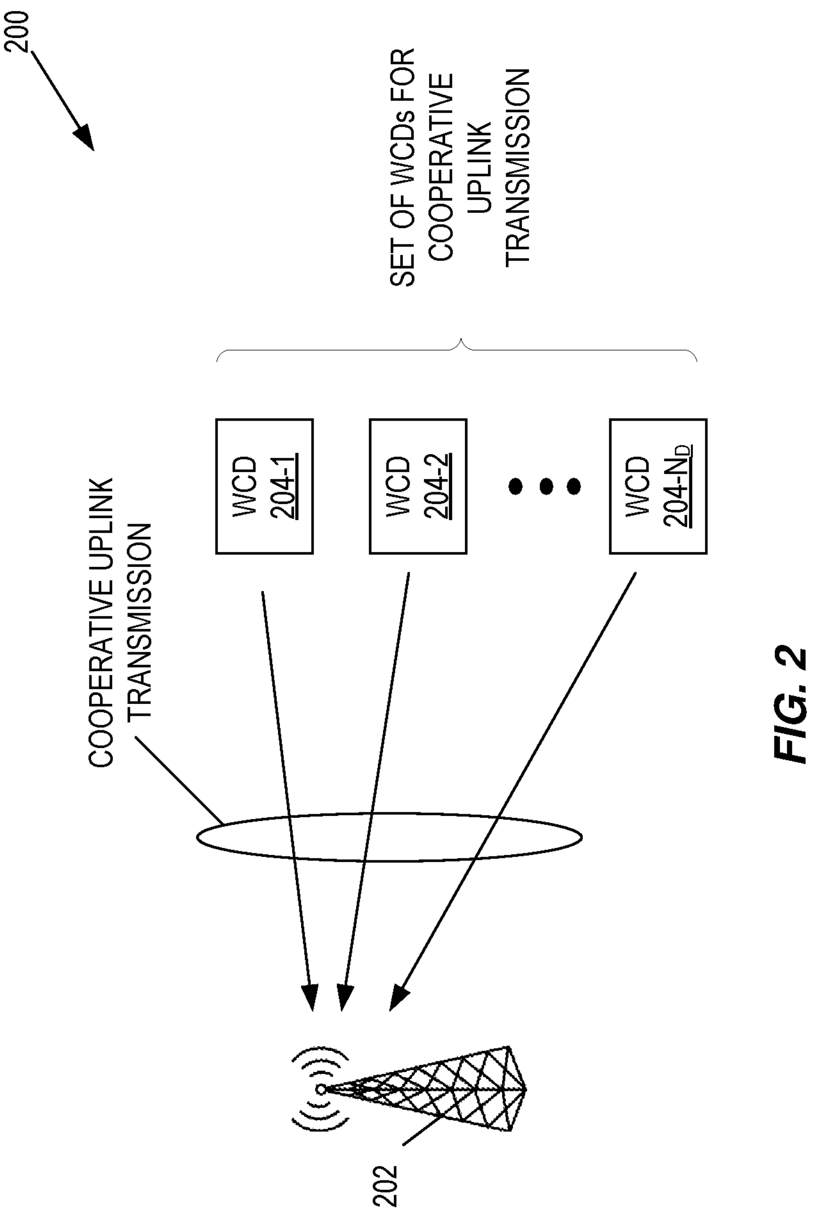
FIG. 2 illustrates a system in which a cooperative uplink transmission is provided in accordance with one embodiment of the present disclosure.

FIG. 2 illustrates a system 200 in which a cooperative uplink transmission is provided in accordance with one embodiment of the present disclosure. As illustrated, the system 200 includes a base station 202 and multiple wireless communication devices (WCDs) 204-1 through 204-ND, which are generally referred to herein individually as WCD 204 and collectively as WCDs 204. The base station 202 may be, for example, one of the base stations 102 of FIG. 1, and the WCDS 204 may be, for example, some of the wireless communication devices 112 of FIG. 1. In one embodiment, the WCDs 204 are ZP devices. In general, the WCDs 204 form a set of WCDs that operate together to provide a cooperative uplink transmission, i.e., a group of two or more uplink transmissions from a group of two or more of the WCDs 204 of a transmission using at least a subset of the same set of resources that is mapped to a data element (e.g., message or bit) to be communicated by the cooperative uplink transmission. As discussed below, in some embodiments, the set of resources consist of a single resource, and the two or more uplink transmission from the two or more WCDs 204 use the same resource. In other embodiments, the set of resources consists of multiple resources, and the two or more uplink transmission from the two or more WCDs 204 use at least a subset of the multiple resources in the set of resources. In this case, at least some of the two or more WCDs 204 use different resources in the same set of resources that is mapped to the data element to be communicated by the cooperative uplink transmission.

More specifically, the WCDs 204 are configured to transmit any of a set of possible data elements, where this set of data elements includes two or more data elements. The data elements may be any type of data. For example, in one embodiment, the WCDs 204 are a particular type of device such as, e.g., a particular type of sensor device, and the set of possible data elements is the set of output values of the sensor device or a set of bit values or sequences that represent the set of output values of the sensor device. Each data element from the set of possible data elements is associated, or mapped, to a corresponding set of resources for cooperative uplink transmission. The WCDs 204 are arranged such that all of the WCDs 204 or at least some of the WCDs 204 will report the same data element from the set of possible data elements (e.g., temperature sensors that measure and report the same temperature value) at the same time. The WCDs 204 then transmit a transmission (e.g., a message or a predefined signal) using at least a subset of the set of resources that is mapped to the data element that is to be reported by the WCDs 204. The WCDs 204 reporting the same data element transmit the same transmission (e.g., the same message or the same predefined signal) using at least a subset of the same set of resources (forming what is referred to herein as a cooperative uplink transmission) such that these transmissions are aggregated at the base station 202 to provide an aggregate signal having improved SINR.

As an example, consider a scenario in which the WCDs 204 are temperature sensors that are located in proximity to one another within a room of a building where each temperature sensor measures a temperature of the ambient environment within the room and reports the measured temperature. Further, for this example, consider the scenario in which the temperature in measured in one-degree increments from −20 degrees Celsius to +60 degrees Celsius. In this case, the set of possible temperatures (i.e., the set of data possible data elements) that can be reported is the set {−20° C., −19° C., −18° C., . . . , +59° C., +60° C.}. Each temperature value in this set of temperature values is associated, or mapped, to a respective set of resources for uplink transmission. Thus, in this example, there are 81 possible temperature values and thus 81 configured sets of resources. Each temperature sensor measures the temperature in the room and then transmits a transmission (e.g., a predefined signal) using at least a subset of the set of resources that is mapped to the measured temperature value. Assuming that at least some of the temperature sensors are to report the same temperature (since they are in proximity to one another within the room), the temperature sensors that are reporting the same temperature value transmit the same transmission (e.g., the same predefined signal) using at least a subset of the same set of resources. These signals form a cooperative uplink transmission. At the base station 202, these signals are aggregated (e.g., they constructively combine) to provide an aggregate signal having improved SINR.

Figure 3:
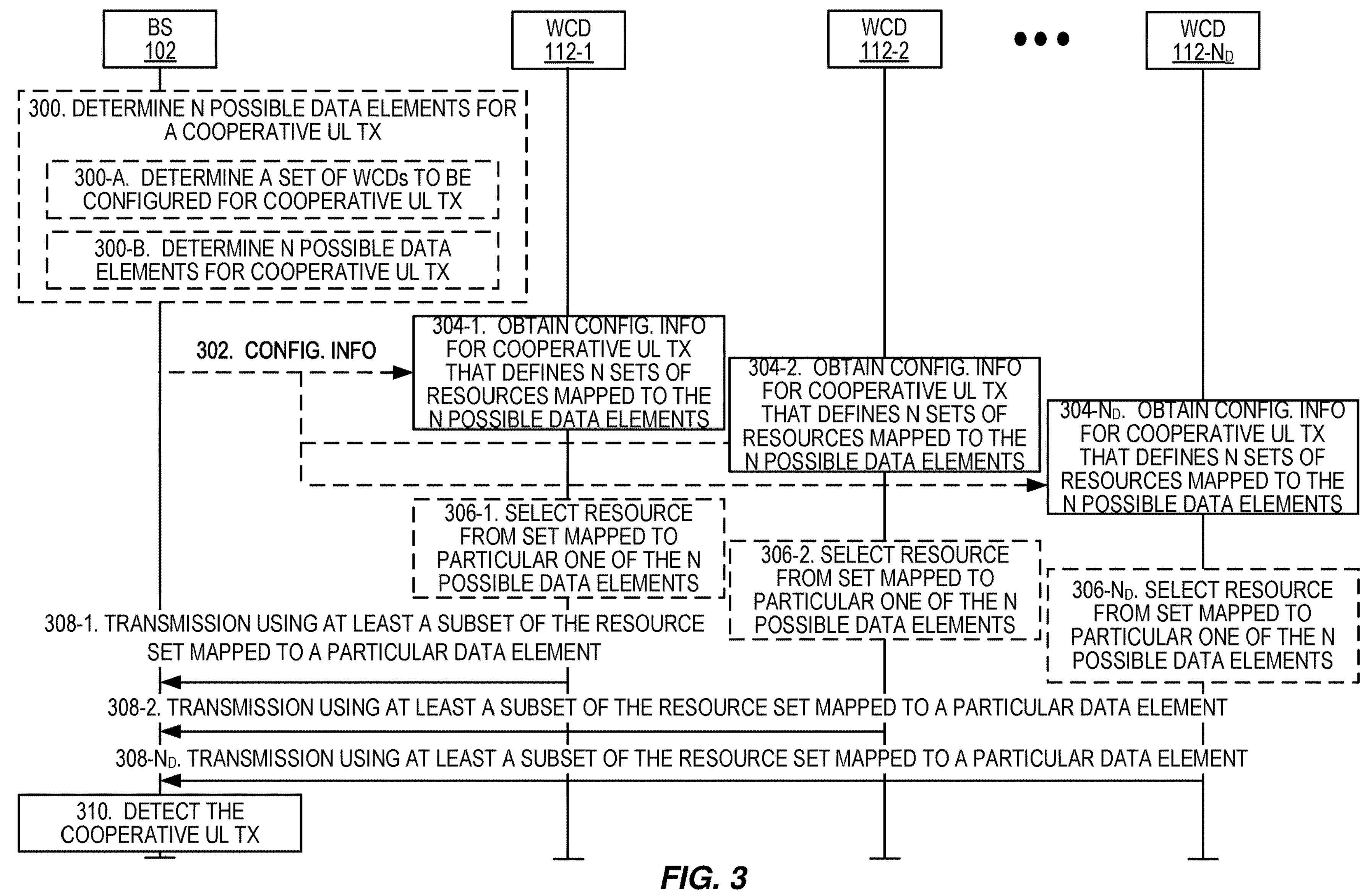
FIG. 3 illustrates the operation of the system of FIG. 2 in which cooperative uplink transmission is performed in accordance with embodiments of the present disclosure.

FIG. 3 illustrates the operation of the system 200 of FIG. 2 in accordance with embodiments of the present disclosure. Note that optional steps are represented by dashed lines/boxes. As illustrated, in some embodiments, the base station 202 determines a set of N possible data elements for a cooperative uplink transmission (step 300). Note that N is an integer value. As discussed below, in most embodiments, N is an integer value that is greater than 1. In other words, the set of possible data elements includes two or more data elements. However, in relation to embodiments described below related to On-Off Keying (OOK), N may be equal to 1. However, for much of the description below, N is greater than 1.

More specifically, in one embodiment, the base station 202 determines a set of WCDs to be configured for cooperative uplink transmission (step 300-A). In this example, the set of WCDs consists of the WCDs 204-1 through 204-ND. The set of WCDs to be configured for cooperative uplink transmission may be determined based on one or more parameters such as, e.g., device type in terms of task(s) performed (e.g., temperature sensor, rain sensor, on/off detector, etc.), one or more device capabilities (e.g., senor sensitivity or precision, maximum supported data rate, etc.), physical location (e.g., WCDs in a certain geographical area can be grouped), device energy or power availability profile (e.g., source of energy/power, duty cycle of energy harvesting device for a ZP device, etc.), device identity (ID) (e.g., fixed or temporarily assigned device ID), or the like, or any combination thereof. For example, the set of WCDs may be multiple WCDs located in close proximity to one another (e.g., in the same room, on the same floor of a building, or the like) that are of the same device type (e.g., temperature sensor, humidity sensor, or the like). In another example, the set of WCDs may be all solar-powered wind sensors located at a particular wind farm.

The base station 202 then determines the set of possible data elements for cooperative uplink transmission for the determined set of WCDs (step 300-B). In one embodiment, the set of possible data elements is determined based on one or more parameters of the WCDs 204 in the set of WCDs determined for cooperative uplink transmission. These one or more parameters may include, for example, the device type of the WCDs 204 in the set, device capabilities of the WCDs 204 in the set, or the like, or any combination thereof. For example, different sets of possible data elements for different types of WCDs (e.g., different sets of possible data elements for different types of sensors) may be predefined and stored at the base station 202 or at an associated network node from which the base station 202 is able to obtain the set of possible data elements.

In some embodiments, the base station 202 sends configuration information to the WCDs 204-1 through 204-ND (i.e., to the set of WCDs for cooperative uplink transmission) (step 302). This configuration information includes, in some embodiments, information that configures N sets of resources and information that associates (explicitly or implicitly) the N set of resources to the N possible data elements for the cooperative uplink transmission. There is a 1-to-1 mapping between the sets of resources and the possible data elements. Preferably, the N sets of resources are different sets of resources and, more preferably, the N sets of resources are mutually exclusive or disjoint sets of resources. In one embodiment, the sets of resources to be used for cooperative uplink transmission are (pre-)configured over time, e.g., periodically, e.g., every n symbols or slots or subframes. There can be multiple resources within a period. In one embodiment, a resource within a set of resources used for transmitting the predefined signal consists of Nsc subcarriers in Nsiots slots of a multi-carrier communication system used by the base station 202 such as, e.g., an Orthogonal Frequency Division Multiplexing (OFDM) system used by the base station 202. In another embodiment, the resource can also contain one or more additional dimensions such as, e.g., a spatial dimension (e.g., beams), a code dimension (e.g., orthogonal cover codes, base sequence, cyclic shift/phase rotation), and/or the like. In one embodiment, the configuration information additionally or alternatively contains information about parameters to be used for the uplink transmission in a resource (e.g., modulation and coding scheme, reference signals, antenna port, and/or a predefined sequence to be used).

In one embodiment, the configuration information is sent from the base station 202 to the WCDs 204 during initial access, during random access, via a downlink control channel (e.g., PDCCH), or via a higher-layer protocol message such as an RRC message. Alternatively, the N sets of resources and/or the N possible data elements for the cooperative uplink transmission may be preconfigured or otherwise known to the WCDs 204. In another embodiment, the sets of resources are allocated by a trigger or poll frame sent by a network node (e.g., the base station 202), which may comprise an uplink grant for some specific WCDs 204, as well as the resources allocated for the uplink transmission.

The WCDs 204-1 through 204-ND obtain the configuration information for cooperative uplink transmission (steps 304-1 through 304-ND). This configuration information defines the N sets of resources and the mapping of the N sets of resources to the N possible data elements for cooperative uplink transmission. As discussed above, this configuration information is, in some embodiments, received from the base station 202. However, in other embodiments, at least some of this configuration information is predefined or preconfigured at the WCDs 204 and, e.g., obtained from memory at the WCDs 204.

During operation, each of the WCDs 204 in the set of WCDs for cooperative uplink transmission determines a data element to be reported from the set of possible data elements and transmits a transmission (e.g., a message or predefined signal) using at least a subset of the set of resources mapped to that data element (steps 308-1 through 308-ND). In one embodiment, the transmission is a predefined signal. This predefined signal may be, for example, a predefined physical signal or a predefined physical channel.

In a first embodiment, each set of resources includes a single resource, and the WCDs 204 transmit the transmission on the single resource that is mapped to the data element to be reported by that WCD 204. At least some, if not all, of the WCDs 204 will report the same data element. As such, those WCDs 204 that are reporting the same data element transmit the same transmission on the same single resource that is mapped to the data element being reported. At the base station 202, these transmissions are aggregated (e.g., combined) such that the resulting aggregate signal has improved SINR.

In a second embodiment, each set of resources includes multiple resources, and the WCDs 204 select one of the multiple resources from the set of resources that is mapped to the data element to be reported for uplink transmission (step 306-1 through 306-ND). In one embodiment, this selection is done randomly such that each WCD 204 randomly selects one of the multiple resources from the set of resources that is mapped to the data element to be reported for uplink transmission. In another embodiment, the selection is done in a deterministic manner. For example, the selection may be based on a device identity (ID) of the WCD 204 (e.g., a device ID of the WCD 204 within the network or a device ID of the WCD 204 within the set of WCDs 204 configured for the cooperative uplink transmission). In one embodiment, the number of resources in each set is greater than or equal to the number of WCDs 204, and the selection is such that each WCD 204 that reports the same data element selects a different resource from the respective set of resources. However, in another embodiment, the selection is such that at least some, but not necessarily all, of the WCDs 204 that reports the same data element select different resources from the respective set of resources. This may be the case when, for example, the number of resources in the set of resources is less than the number of WCDs 204 that report the respective data element.

In one embodiment, the WCDs 204 transmit the transmission only once using at least a subset of the set of resources (as in either the first or second embodiment above) that is mapped the data element being reported. In another embodiment, the WCDs 204 repeat the transmission multiple times using the set of resources (as in either the first or second embodiment above) that is mapped to the data element being reported. The number of repetitions can be nominally configured/indicated by the network (e.g., by the base station 202). The actual number of repetitions performed by the WCD 204 can depend on other parameters such as energy availability at the WCD 204 and thus can be different from the configured/indicated nominal number of repetitions.

In case that the resource sets to be used for cooperative uplink transmission are configured periodically in time where there are multiple instances of each resource set within a period, the WCDs 204 may transmit the transmission once using one of the multiple instances of the set of resources mapped to the data element to be reported within the period. The WCDs 204 may select which specific instance of the set of resources within the period to use. For example, a WCD 204 may choose to transmit on the set of resources only when the WCD 204 has pending data and/or sufficient energy.

In one embodiment, the transmission transmitted by the WCDs 204 is modulated but uncoded. For example, the transmission may be a predefined signal that is modulated but uncoded. In another embodiment, the transmission is channel coded. For example, the transmission may be a predefined signal that is channel coded. In another embodiment, the transmission is a sequence (e.g., a Zadoff-Chu sequence or a pseudo-random sequence). For example, the transmission may be a predefined signal defined by a bit sequence. In another embodiment, the transmission may be based on (e.g., modulated by) common information such as, for example, a group ID assigned to the WCDs 204.

At the base station 202, the base station 202 detects the cooperative uplink transmission (step 310). In one embodiment, the detection is performed by detecting an amount of energy received on each set of resources configured for the cooperative uplink transmission. The set of resources having the highest detected energy is then the set of resources on which the cooperative uplink transmission is received. As such, the cooperative uplink transmission is interpreted as a cooperative uplink transmission that indicates the data element that is mapped to the set of resources on which the cooperative uplink transmission is detected.

In one embodiment, the base station 202 produces an output (e.g., detects the data element indicated by the cooperative uplink transmission) based on the aggregated signal received on at least one of the N configured resource sets configured for the cooperative uplink transmission from the set of WCDs 204. In one embodiment, the base station 202 determines a weighted average of the received power or SINR on the sets of resources and uses the weighted average to make a decision on what data element has been reported by the cooperative uplink transmission. In a special case, the base station 202 only considers the resource set with highest received power or SINR, where the data element mapped to this resource set is considered as the data element communicated by the cooperative uplink transmission.

In another embodiment, the base station 202 first determines a set of outputs, each based on the aggregated signal received at one of the sets of resources. Then, the base station 202 produces a final output based on the set of determined outputs.

Examples

Example 1: N sets of resources are allocated to a group of temperature sensors. Each resource set is used to send a quantized level of temperature. All temperature sensors in the group that output the same quantized temperature level will transmit a predefined signal using the same set of resources (i.e., the set of resources mapped to that level). The base station 202 computes a weighted average of the SINRs for the N sets of resources as:

$$SINR_{wa} = \sum_{k=1}^{N} w_k \cdot SINR_k$$

where the weights are chosen such that:

$$w_k \geq 0 \text{ for all } k \text{ and } \sum_{k=1}^{N} w_k = 1.$$

The base station 202 finds the value of k where SINR k is closest to $SINR_{wa}$ and declares the temperature value corresponding to that value of k as the output temperature. The values of the weights can be chosen in any desired manner. As a first example, $w_k=1$ for the set k which has the highest SINR and $w_k=0$ for all other k's. This is equivalent to using only the strongest SINR to determine the output power. As a second example, $w_k=1/N$ for all k's, which means the base station 202 computes the usual average (the mean) of the SINR's. Alternatively, $w_k$'s are chosen based on the base station's belief of which temperatures are more likely than the others (e.g., based on side information like the season of the year, day or night, geographical location of the sensors etc.). Those temperatures that are more likely will get higher weights and vice versa. Note that the same predefined signal may for example be used by the temperature sensors for all the N different temperature levels, but the predefined signal is transmitted in different sets of resources to indicate different temperature levels. However, different predefined signals could also be used for the different temperature levels.

Example 2: Consider the same setting as in Example 1 but where the base station 202 first determines the sets of resources which have received power exceeding a certain threshold. The base station 202 then outputs a temperature value equal to the average or weighted average of the temperature values corresponding to those sets of resources. For example, the base station 202 determines sets of resources, from the N sets of resources allocated, whose received power values or SINR values are above a certain threshold. The threshold may be set such that, for example, the threshold is so low that all N sets of resources are selected, but is not limited thereto. The base station 202 then computes a weighted average of the temperature values corresponding to the selected/determined sets of resources and declares the computed average as the output temperature. There are different ways of selecting the weights. In one example, the weight applied to each temperature value is the power/energy/SINR level detected at the set of resources corresponding to that temperature value.

Example 3: Two sets of resources are configured for a group of detection sensors. One resource set is configured for sending "ON," and the other resource set is configured for sending "OFF." WCDs 204 detecting "ON" send the same signal in the resource set configured for "ON", and the WCDs 204 detecting "OFF" send the same signal in the resource set configured for "OFF". The base station 202 can deduce whether the cooperative uplink signal communicates an "ON" or "OFF" based on comparing the received power in the two sets of resources. Note that the same signal may for example be used for "ON" and "OFF", but the signal is transmitted in different sets of resources to indicate "ON" or "OFF". The detection sensors could also use one predefined signal for "ON" (and transmitted in one set of resources) and another predefined signal for "OFF" (and transmitted in another set of resources).

Example 4: Two sets of resources are configured for the group of WCDs 204. One resource set is configured for sending ACK, and the other resource set is configured for sending NACK (e.g., for a downlink transmission from the base station 202). The base station 202 can determine whether a retransmission is needed based on the relative received power in resource sets configured for ACK and NACK. Note that the same signal (but transmitted in different sets of resources) may for example be used for ACK and NACK.

In one embodiment, the transmission transmitted by the WCDs 204 is a physical channel such as, e.g., a physical uplink control channel (PUCCH) or physical uplink shared channel (PUSCH), and the base station 202 decodes the cooperative uplink transmission based on the aggregated received signals from these individual physical channels.

In another embodiment, the transmission transmitted by the WCDs 204 are sequences such as Zadoff-Chu sequences or pseudo-random sequences, and the base station 202 detects a sequence based on the aggregated received signals.

In one embodiment, the base station 202 can make further decision such as requesting a retransmission or performing power control or updating the resource and group configuration of the WCDs 204.

In one embodiment, the base station 202 produces an output based on the aggregated signal received on the resource set mapped to the data element being communicated and some neighboring resources in order to take into account any timing misalignment of the WCDs 204 in the group. For example, the base station 202 produces an output per time period based on the aggregated signal received on all configured sets of resources allocated within a period.

Note that, in one embodiment, the set of WCDs 204 for the cooperative uplink transmission is assigned (e.g., preconfigured or configured, e.g., in step 302) with a scrambling sequence to use for the transmissions in steps 308-1 through 308-ND. Different sets of WCDs are assigned different scrambling sequences such that the base station 202 can distinguish transmissions from different groups based on the scrambling sequences used.

In one embodiment, the set of WCDs 204 for cooperative uplink transmission may be defined at various levels such as, e.g., beam-specific, cell-specific or tracking area-specific. The base station 204 may broadcast information about the composition and allotted resources for the configured sets of WCDs 204. In this manner, upon a particular WCD 204 receiving this broadcast information, the WCD 204 determines the set to which it belongs (e.g., based on device type, location, and/or the like) and then obtains the configured sets of resources for the set of possible data elements that can be reported by the WCD 204 from the broadcast information.

In should be noted that, in one embodiment, a particular WCD 204 can belong to only a single set of WCDs for cooperative uplink transmission. However, in another embodiment, a particular WCD 204 may belong to one or more sets of WCDs for respective cooperative uplink transmissions.

Example: Temperature sensors inside a building are grouped according to the floor and location in the floor. Sometimes it is required to know the temperature close to a given door or window, so that a set of WCDs 204 for cooperative uplink transmission may consist of those temperature sensors in the vicinity of said door or window. At other times, it may be useful to collect statistics such as minimum/maximum/average temperature in one floor, or even the whole building. For this purpose, it may be convenient to form a group consisting of all the sensors on a given floor. Thus, each temperature sensor can belong to one or more sets, or groups, for respective cooperative uplink transmission.

Example: The network (e.g., the RAN of the cellular communications system 100) may configure a tracking area group (e.g., for temperature sensors) spanning multiple cells. Additionally, the network may also configure a cell-specific group and the corresponding cell-specific resources for each constituent cell. For instance, the same time/frequency resources can be allocated for each cell within the tracking area group, and the devices can be required to use a cell-specific scrambling sequence.

In one embodiment, information about the sets, or groups, that a WCD 204 belongs to is sent from the network (e.g., the base station 204) to the WCD 204 (e.g., during initial access or random access or via downlink control channel (e.g., PDCCH) or via a higher-layer protocol message such as a Radio Resource Control (RRC) message). In another embodiment, the information is pre-configured (e.g., in a Subscriber Identity Modulation (SIM) card).

In one embodiment, different WCDs 204 may have different capability levels (e.g., depending on its power availability). For example, one WCD 204 may only be capable of cooperative uplink transmission while another WCD 204 may be capable of both cooperative uplink transmission and non-cooperative uplink transmission. In one embodiment, a WCD 204 that is capable of both cooperative and non-cooperative uplink transmission may explicitly or implicitly indicate its capability to the network (e.g., the base station 204) e.g., during initial access.

In yet another embodiment, the network (e.g., the base station 202) configures a WCD 204 (e.g., a WCD 204 that is capable of both cooperative uplink transmission and non-cooperative uplink transmission) to perform cooperative uplink transmission or non-cooperative uplink transmission. Alternatively, the WCD 204 may autonomously choose cooperative or non-cooperative uplink transmission without network indication.

Example: For this example, consider a WCD 204 that is a ZP device. When the ZP device has sufficient energy, it may send information to the base station 202 using non-cooperative uplink transmission. When its power availability is scarce, the ZP device may use cooperative uplink transmission to send information.

Example: When the network has recruited a sufficient number of sensors for a certain group for cooperative UL transmission, it may configure additional sensors for non-cooperative UL transmission. For instance, the configured group in a cell may correspond to temperature sensors that are required to report only 1-bit information using cooperative transmission (e.g., temperature exceeds a certain threshold) whereas the remaining temperature sensors are configured in the non-cooperative mode and send more detailed information such as the quantized temperature level.

It should be noted that, in one embodiment, steps 306 (optional) and 308 may be repeated to provide multiple cooperative uplink transmissions in multiple (e.g., successive or consecutive) time periods. For example, in one embodiment, the possible data elements are logical "0" and logical "1", and multiple cooperative uplink transmissions may be performed in consecutive time periods to communicate a bit sequence (e.g., 011). In one embodiment, this bit sequence represents an encoded message (e.g., a 3 bit sequence may encode up to 8 possible messages).

Now, some details of some example embodiments that are applicable to the embodiment described above in which the N sets of resources configured for the N possible data elements each include multiple resources are provided. In this regard, embodiments are disclosed herein in which each WCD 204 transmits a narrowband signal (e.g., a narrowband signal modulated using the same set of data bits such as, e.g., an angle modulated signal or an OOK signal) on a resource(s) within a set of resources mapped to a data element to be communicated by the WCD 204. Each WCD 204 uses only a subset of the resources (e.g., only one of the resources) within the set of resources mapped to the data element to be communicated. At the base station 202, the received signal is the superposition of all of the signals transmitted by the WCDs 204. The received signal resembles a signal from a single WCD, but it has more power. In addition, in one embodiment, the WCDs 204 are ZP devices, and each received data symbol is distributed over a bandwidth and/or a time duration exceeding the bandwidth or time duration of a corresponding data symbol transmitted by any individual ZP device.

These embodiments enhance the coverage of wireless communication with the WCDs 204 (e.g., ZP devices)

without requiring (or requiring less of) a device to lower the bit rate (e.g. repeat a transmission multiple times) and/or increase transmit power. Furthermore, the problem caused by some devices not having enough energy to perform a transmission when needed (e.g., due to insufficient accumulated energy) is alleviated.

Some embodiments enable the WCDs 204, which may be low complexity ZP devices, to collectively and cooperatively generate multicarrier signals by transmitting multiple coordinated narrowband signals which are transmitted over several orthogonal (in time and/or frequency) radio resources within a set of resources mapped to the data element to be communicated by the cooperative uplink transmission. At the base station 204, a multicarrier receiver can be employed to receive the superposition of signals and decode it as if it were a single signal. Since each WCD 204 does not utilize all the available resources in the set of resources, the same information is transmitted in more than one radio resource, reducing the probability of destructive interference.

In some embodiments, aspects of the solution described herein can be integrated into the receivers of multicarrier systems such as OFDM-based systems (e.g., LTE or 5G NR base stations), thereby allowing a base station to serve both ZP devices and other types of devices which employ OFDM waveform.

For the following description, it is assumed that the base station 202 supports a multicarrier air interface (e.g., OFDM-based air interface) with one or more numerologies (i.e. subcarrier spacings, cyclic prefix durations, etc.). On the other hand, the WCDs 204 support a narrowband modulation(s) such as, e.g., an angle modulation(s) such as Frequency Shift Keying (FSK), Gaussian FSK (GFSK), or other modulations like On-Off Keying (OOK) or single carrier Phase Shift Keying (PSK). Angle modulation refers to the process of modulating the phase or frequency of a carrier. Angle modulated signals have constant envelope, and they are often used in applications where high-power efficiency, low hardware complexity, and low cost are essential. By choosing properly the center frequencies and symbol durations, it is possible to ensure that a multicarrier receiver at the base station 202 supports reception of the narrowband signal, as illustrated in the example of FIGS. 4 and 5.

Figure 4:
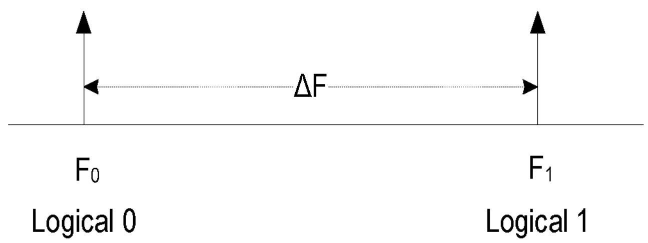
FIG. 4 is an illustration of how Frequency Shift Keying (FSK) can be used in accordance with an example embodiment.

In particular, FIG. 4 is an illustration of how FSK can be used in accordance with an example embodiment. The center frequencies $F_0$ and $F_1$ of the tones used for FSK and the symbol duration coincide with subcarrier frequencies and duration of a multicarrier symbol such that an OFDM receiver at the base station 202 can be employed to receive and decode the FSK signal (from a WCD 204). Thus, in operation (e.g., in steps 306-1 through 306-ND and steps 308-1 through 308-ND), each WCD 204 selects a resource(s) from the set of resources mapped to the data element to be communicated and transmits a predefined FSK modulated narrowband signal on the selected resource(s). At the base station 202, the FSK modulated narrowband signals are superimposed to provide an aggregate signal that is received via the OFDM receiver of the base station 202.

Figure 5:
FIG. 5 is an illustration of how On-Off Keying (OOK) can be used in accordance with another example embodiment.

FIG. 5 is an illustration of how OOK can be used in accordance with another example embodiment. The center frequency $F_0$ of the tone used for OOK and the symbol duration coincide with a subcarrier frequency and duration of a multicarrier symbol such that an OFDM receiver at the base station 204 can be employed to receive and decode the OOK signal (from a WCD 204). Thus, in operation (e.g., in steps 306-1 through 306-ND and steps 308-1 through 308-ND), each WCD 204 selects a resource(s) from the set of resources mapped to the data element to be communicated and transmits a predefined OOK modulated narrowband signal on the selected resource(s). At the base station 202, the OOK modulated narrowband signals are superimposed to provide an aggregate signal that is received via the OFDM receiver of the base station 202.

As an example, the WCDs 204 may be devices attached to one particular window of a building. In one embodiment, e.g., in step 302, the base station 202 signals to all of the WCDs 204 the sets of resources to be used for a cooperative uplink transmission, an information element specifying a quantization of the data (i.e., information that specifies the set of possible data elements), and information that specifies, for each possible data element, the mapping between the possible data element and a respective one of the configured sets of resources. In addition, the sets of resources for cooperative uplink transmission of one data symbol are allocated such that they exceed the resources needed to transmit one data symbol by a single WCD 204. The base station 202 may perform the signaling by means of a control channel, or by transmitting a special purpose control frame, such as a trigger frame.

Figure 6:
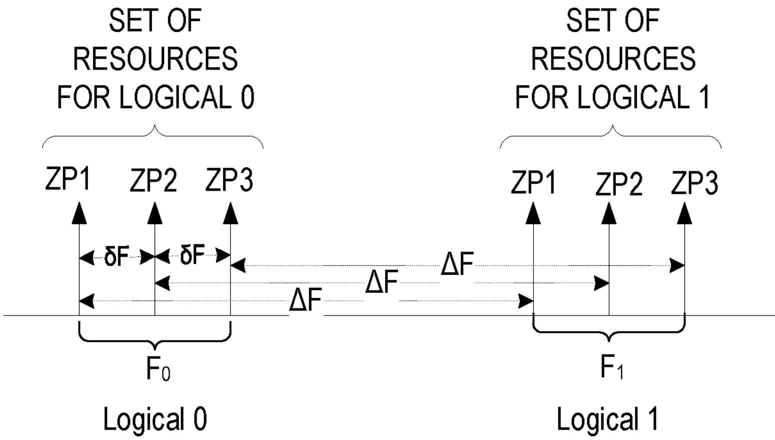
FIG. 6 illustrates an example in which wireless communication devices employ FSK and are allocated orthogonal resources for cooperative uplink transmission.

Continuing with the example above, suppose that it is desired to find out whether the particular window of the building is open. Further, each set of resources includes multiple resources. Here, each resource is a single subcarrier and a time duration. Note that the possible data elements are two values—open (represented by logical "1" in this example) and closed (represented by logical "0" in this example). The WCDs 204 whose sensors indicate "closed" then transmit using different resources from the set of resources mapped to "closed." In doing so, these WCDs 204 employ exactly the same data bits to modulate the transmitted waveform. These data bits may comprise, for example, a group ID and/or other common information. Likewise, the WCDs 204 whose sensors indicate "open" then transmit using different resources from the set of resources mapped to "open." In doing so, these WCDs 204 employ exactly the same data bits to modulate the transmitted waveform. These data bits may comprise, for example, a group ID and/or other common information. This is illustrated in FIG. 6 in the case where the WCDs 204 employ FSK and are allocated orthogonal resources. Here, the WCDs 204 transmit simultaneously, with each 204 sending a tone at a frequency $F_0+k\cdot\delta F$ if the common data bit is a logical 0, and at a frequency $F_1+k\cdot\delta F$ if the data bit is a logical 1.

Figure 7:
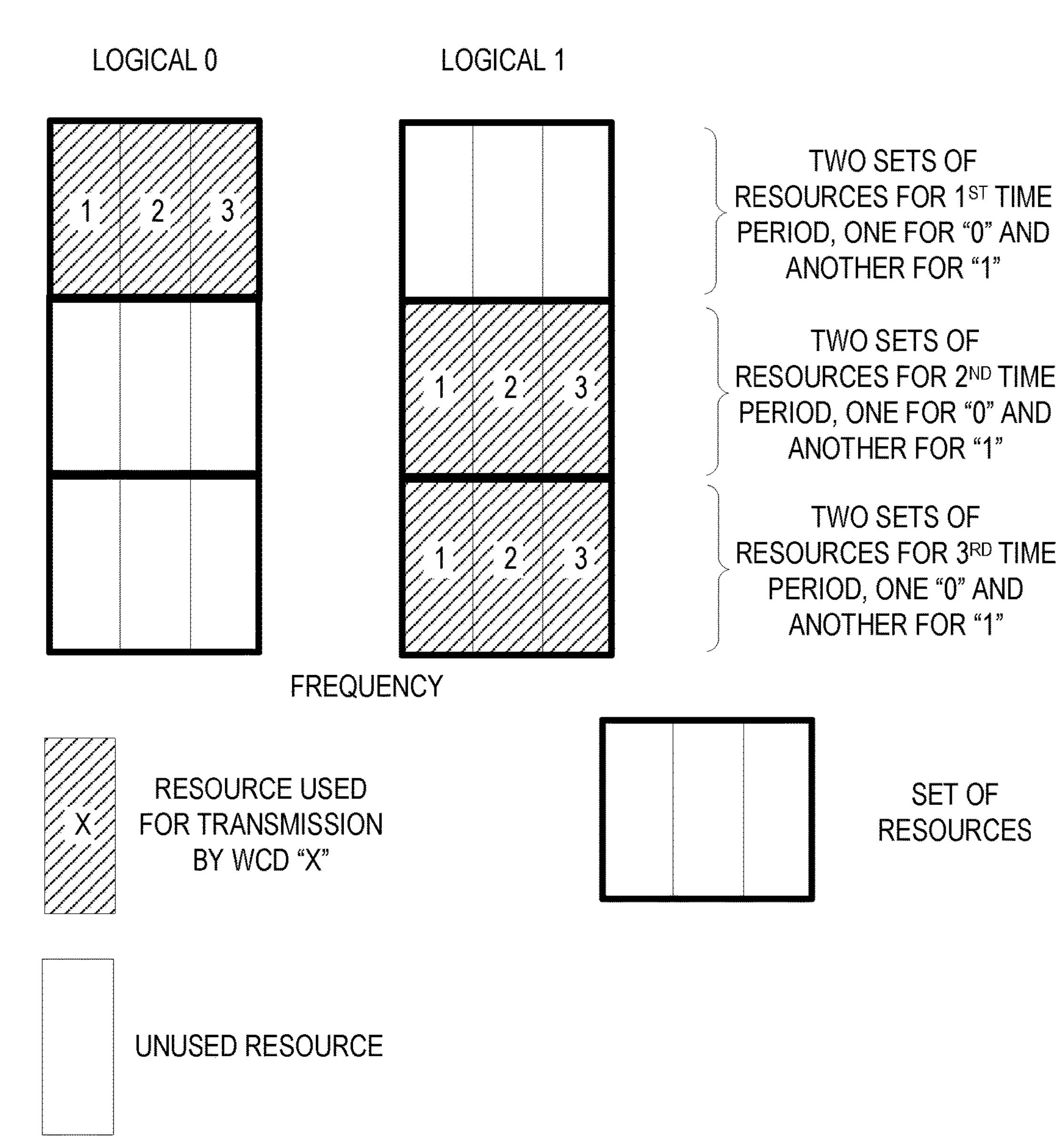
FIG. 7 illustrates an example in which the wireless communication devices use FSK and cooperative uplink transmission to transmit a bit sequence, which is "011" in this example, in accordance with another embodiment of the present; disclosure

FIG. 7 illustrates an example in which the WCDs 204 use FSK and cooperative uplink transmission to transmit a bit sequence, which is "011" in this example, in accordance with another embodiment of the present disclosure. FIG. 7 extends cooperative uplink transmission to multiple time periods, where cooperative uplink transmissions are transmitted in multiple (e.g., consecutive) time periods, each communicating either logical "0" or logical "1." More specifically, a first set of resources is mapped to logical "0," and a second set of resources is mapped to logical "1." In this example, the same sets of resources and mappings to logical "0" and logical "1" apply to multiple time periods (i.e., three time periods in this example). The WCDs 204 then transmit multiple successive cooperative uplink transmission by transmitting a cooperative uplink transmission that communicates either a "0" or "1" in each of the multiple time periods. In one embodiment, the multiple bits represent a single message. In this particular example, the WCDs 204 transmit a predefined narrowband signal on respective resources within the first set of resources mapped to logical "0" in the first time period to provide a first cooperative uplink transmission. In the second time period, the WCDs 204 transmit a predefined narrowband signal on respective resources within the second set of resources mapped to logical "1" to provide a second cooperative uplink transmission. Likewise, in the third time period, the WCDs 204 transmit a predefined narrowband signal on respective resources within the second of resources mapped logical "1" to provide a third cooperative uplink transmission. In this manner, FSK modulation is provided across the three time periods. In one embodiment, these three bits (011) form a single (encoded) message.

An alternative to the resource allocation used in the example of FIG. 7 is shown in FIG. 8. In this alternative, the resources within each set of resources are different time resources (e.g., different symbol periods), rather than different frequency resources (e.g., different subcarriers).

Notice that from the receiver point of view, the signals transmitted by the WCDs 204 in the examples of FIG. 7 and FIG. 8 result in a received signal that is the superposition of the signals from several WCDs 204. This superposition results in FSK signals, but each data symbol at the receiver has wider bandwidth or longer duration than that of a data symbol transmitted by any single WCD 204. Thus, the receiver will experience a power gain. Moreover, the received signal is a multicarrier signal where some of the subcarriers have been nulled, so that a multicarrier receiver can be employed.

For the FSK related embodiments above, in one embodiment, the sets of resources for the two possible bit values (i.e., logical "0" and logical "1") are defined in accordance with a FSK transmission scheme with a frequency deviation that is a multiple of (i.e., lx, 2*x*, 3*x*, etc.) of a subcarrier spacing of a multi-carrier system (e.g., an OFDM system) in which the cooperative uplink transmission is made (e.g., multiple of the subcarrier spacing of the multi-carrier system used by the base station 202). In one embodiment, the transmission transmitted by each of the WCDs 204 uses a single-carrier modulation where a modulation symbol has a same duration as one or more multi-carrier symbols of the multi-carrier system.

Figure 9:
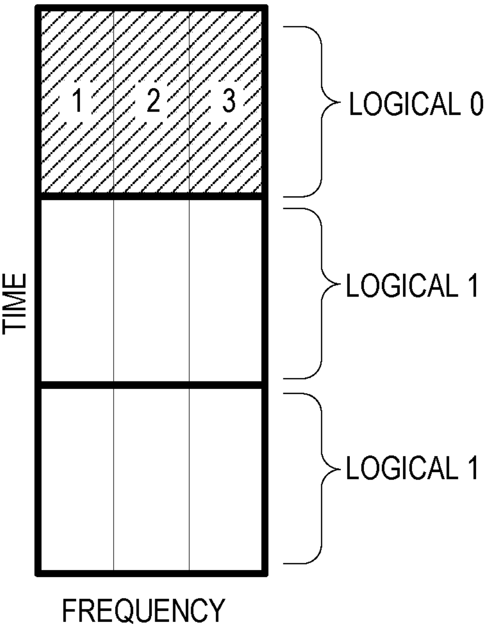
FIG. 9 illustrates yet another example of cooperative uplink transmission where the wireless communication devices employ OOK.
Figure 9:
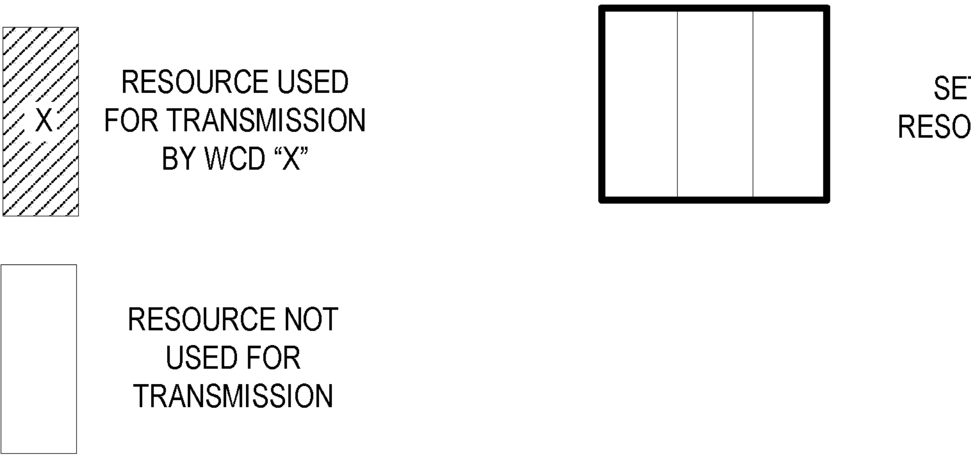

FIG. 9 illustrates yet another example of cooperative uplink transmission where the WCDs 204 employ OOK. Note that, for OOK, configuration can be a configuration of two sets of resources, where one set of resources is mapped to the "on-signal" and thus a first possible data element and another set of resource is mapped to the "off-signal" and thus a second possible data element. In other words, the first possible data element is communicated by the WCDs 204 transmitting a transmission using the first set of resources, and the second possible data element is communicated by the WCDs 204 not transmitting a transmission using the second set of resources. Preferably, the two sets of resources are the same set of resources. Conversely, the configuration for OOK can be a configuration of a single set of resources, where the WCDs 204 either transmit using the set of resources to indicate a first possible data element (e.g., logical "0" in this example) or refrain from transmitting using the set of resources to indicate a second possible data element (e.g., logical "1" in this example). Thus, for OOK, the configuration information of steps 304-1 through 304-ND includes, in some embodiments, information that configures two sets of resources (i.e., a first set of resources for the on-signal mapped to a first possible data element and a second set of resources for the off-signal mapped to a second possible data element, where the first and second sets of resources are preferably the same set of resources) or information that configures a single set of resources where transmission using that set of resources is mapped to a first possible data element and no transmission using that set of resources is mapped to a second possible date element. Looking at the example of FIG. 9, the same set of resources is configured for multiple time periods to again enable multiple cooperative uplink transmissions to covey multiple bits using OOK. In this particular example, the WCDs 204 transmit a predefined narrowband signal on respective resources within the set of resources to convey a logical "0" in the first time period. In the second time period, the WCDs 204 refrain from transmitting a predefined narrowband signal within the set of resources mapped to covey logical "1." Likewise, in the third time period, the WCDs 204 refrain from transmitting a predefined narrowband signal within the set of resources mapped to covey logical "1."

For the OOK related embodiments above, in one embodiment, the set of resources is defined in accordance with a OOK transmission scheme, and the set of resources is defined such that an on-signal that corresponds to the transmission being transmitted using at least a subset of the set of resources has the same duration as one or more multi-carrier symbols of a multi-carrier system (e.g., an OFDM system) in which the cooperative uplink transmission is made (e.g., multiple of (e.g., lx, 2*x*, 3*x*, etc.) the OFDM symbol/slot/subframe duration of the multi-carrier system used by the base station 202).

Figure 10:
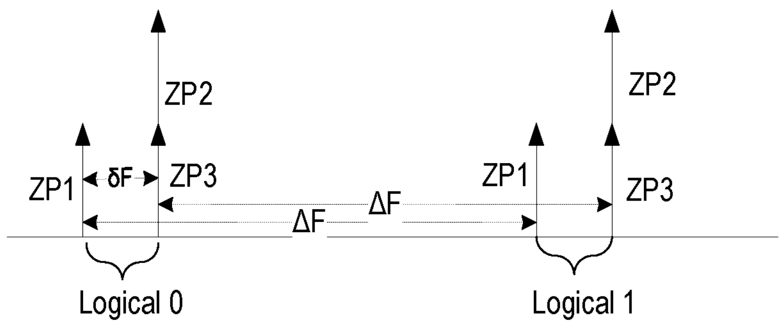
FIG. 10 illustrates another example in which the wireless communication devices randomly select resources within the set of resources on which to transmit for cooperative uplink transmission in accordance with an embodiment of the present disclosure.

In the examples of FIGS. 6-9, the WCDs 204 transmit on different resources within the same resource set that is mapped to the data element to be communicated. FIG. 10 illustrates another example in which the WCDs 204 randomly select resources within the set on which to transmit. As such, two (or more) of the WCDs 204 may end up transmitting on the same resource in the set. An example of this is illustrated in FIG. 10 where there are three WCDs 204 that employ FSK for cooperative uplink transmission, and the WCDs 204 randomly select the resources to use for uplink transmission of the predefined signal from the set of resources mapped to the data element to be communicated. In this example, the set of resources mapped to logical "0" consists of two subcarriers, the set of resources mapped to logical "1" consists of two subcarriers, and there are three WCDs 204 that randomly select the subcarrier to on which to transmit from the set of resources mapped to a logical "0" if they desire to communicate a "0" or from the set of resources mapped to a logical "1" if they desire to communicate a "1".

Figure 11:
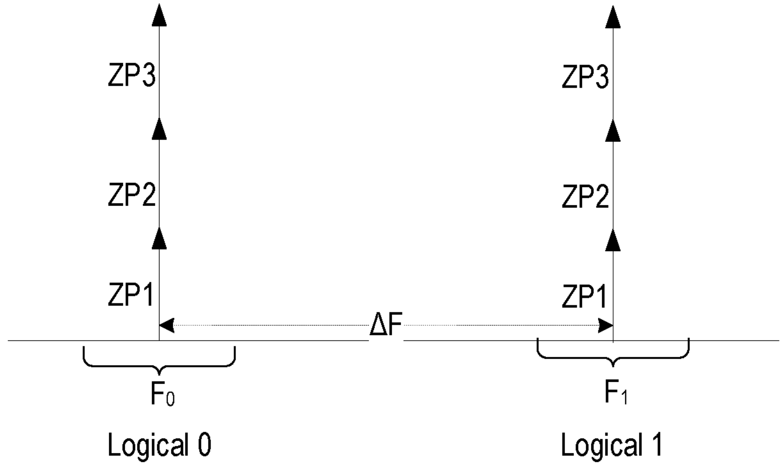
FIG. 11 illustrate another example resource allocation but where all wireless communication devices transmitting on a set of resources use the same subcarrier.

Embodiments of the present disclosure propose that the sets of resources for uplink transmission of one data symbol be allocated such that they exceed the resources needed to transmit one data symbol by a single WCD 204. This means that the WCDs 204 cooperatively transmit the same data but the resulting transmission is a superposition of waves spread in frequency and/or time in order to avoid destructive interference. Consider the allocation shown in FIG. 11 where all of the WCDs 204 employ FSK with the same subcarriers. Although the average received power is the same as in the allocation shown in FIG. 6, the random nature of the wireless channel implies that the transmitted signals sometimes create destructive interference. By using different (orthogonal) resources (within the same set of resources mapped to the desired data element to be communicated), embodiments of the present disclosure avoid or mitigate destructive interference.

Figure 12:
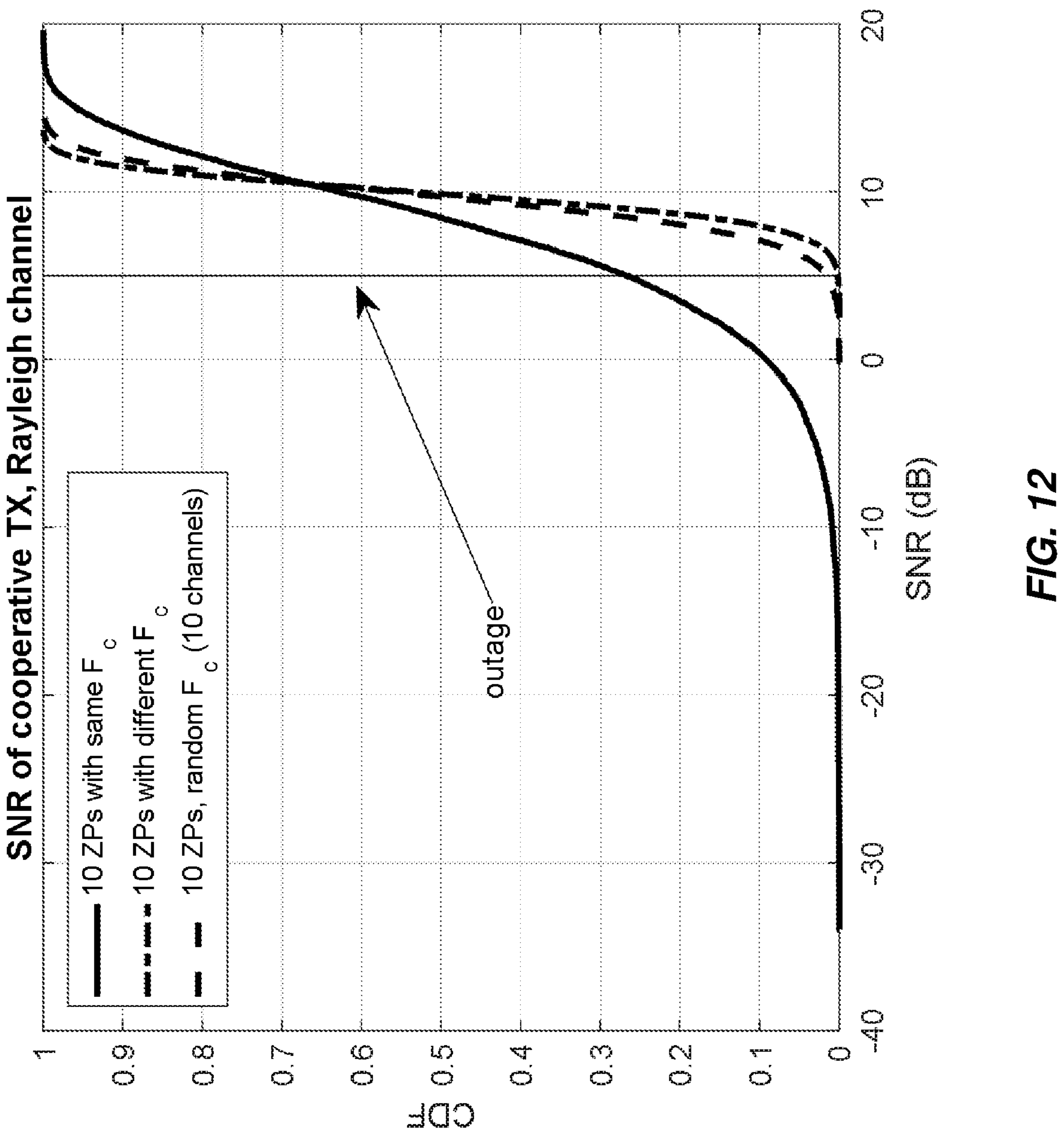
FIG. 12 illustrates performance degradation due to destructive interference.

The performance degradation due to destructive interference is illustrated in FIG. 12. In this example, ten devices are scheduled for cooperative transmission. Three cases are considered, first all devices employ the same frequency resources, second all devices employ orthogonal frequency resources, and third the devices make a random choice from a set of allocated group resources. It can be seen that the outage probability increases dramatically due to destructive interference.

Further, in one embodiment, the sets of resources configured for different groups of WCDs are orthogonal, e.g., in different sets of time and/or frequency resources. The resources for different groups of WCDs can be separately configured or assigned by the network, or randomly chosen from a configured resource pool.

Figure 13:
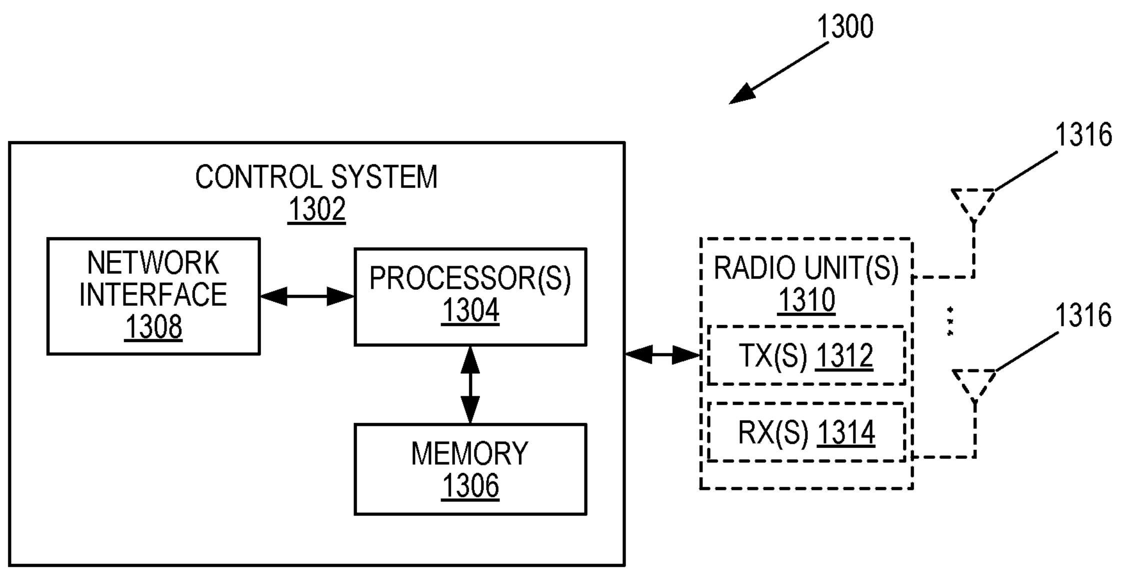
FIG. 13 is a schematic block diagram of a radio access node according to some embodiments of the present disclosure.

FIG. 13 is a schematic block diagram of a radio access node 1300 according to some embodiments of the present disclosure. Optional features are represented by dashed boxes. The radio access node 1300 may be, for example, the base station 102 or 202 or a network node that implements all or part of the functionality of the base station 102 or 202 as described herein. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 may include one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of the radio access node 1300 as described herein (e.g., one or more functions of the base station 202 as described herein). In some embodiments, the function(s) are implemented in software that is stored, e.g., in the memory 1306 and executed by the one or more processors 1304.

Figure 14:
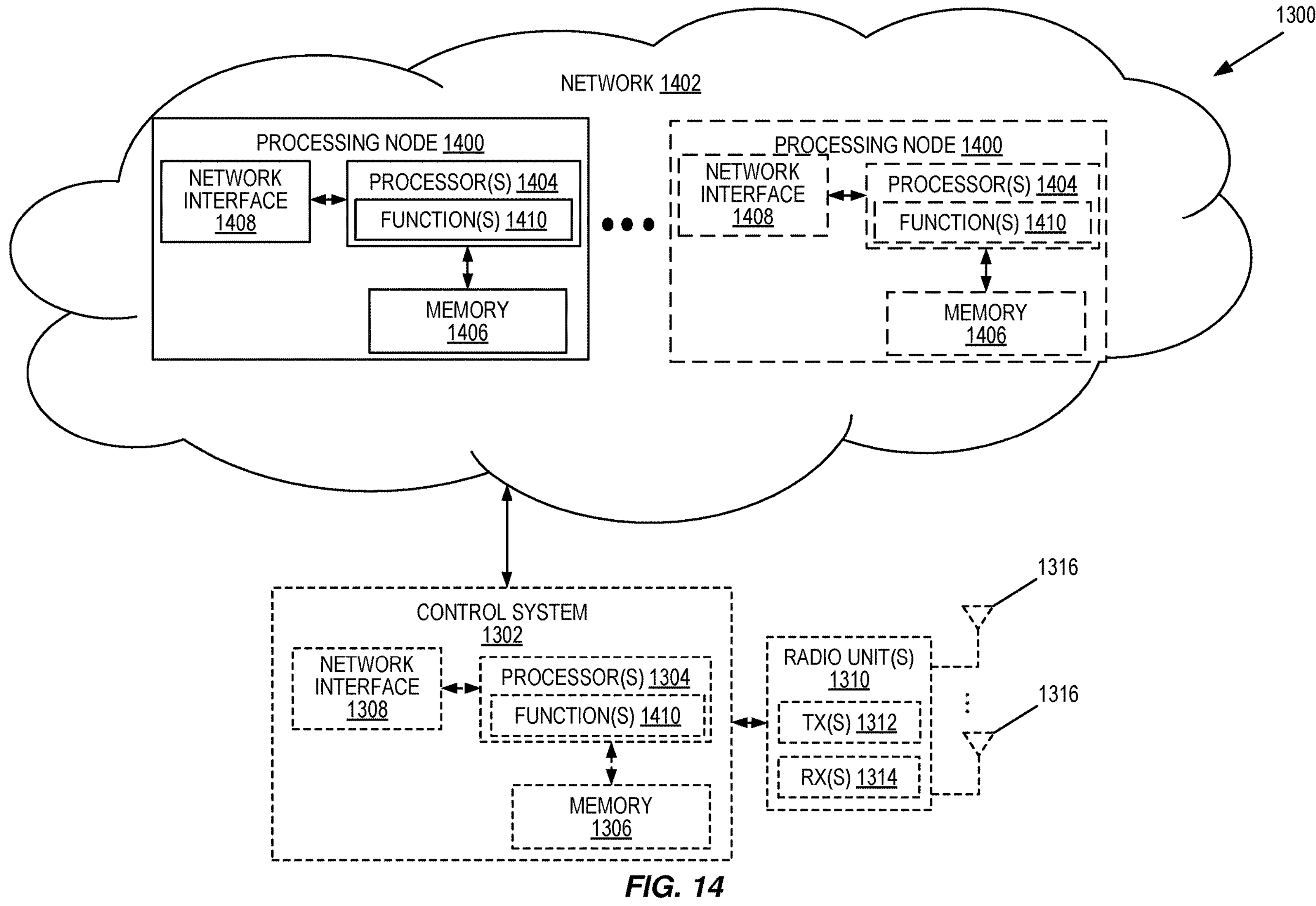
FIG. 14 is a schematic block diagram that illustrates a virtualized embodiment of the radio access node of FIG. 13 according to some embodiments of the present disclosure.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures. Again, optional features are represented by dashed boxes. As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 may include the control system 1302 and/or the one or more radio units 1310, as described above. The control system 1302 may be connected to the radio unit(s) 1310 via, for example, an optical cable or the like. The radio access node 1300 includes one or more processing nodes 1400 coupled to or included as part of a network(s) 1402. If present, the control system 1302 or the radio unit(s) are connected to the processing node(s) 1400 via the network 1402. Each processing node 1400 includes one or more processors 1404 (e.g., CPUs, ASICs, FPGAs, and/or the like), memory 1406, and a network interface 1408.

In this example, functions 1410 of the radio access node 1300 described herein (e.g., one or more functions of the base station 202 as described herein) are implemented at the one or more processing nodes 1400 or distributed across the one or more processing nodes 1400 and the control system 1302 and/or the radio unit(s) 1310 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of the radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
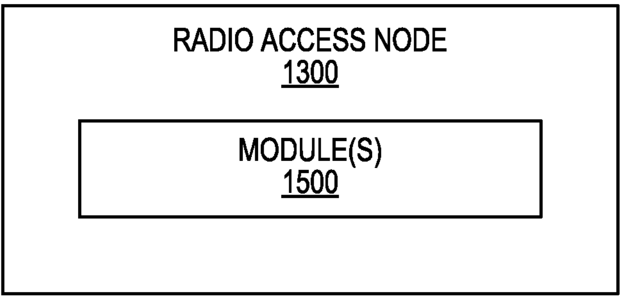
FIG. 15 is a schematic block diagram of the radio access node of FIG. 13 according to some other embodiments of the present disclosure.

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein (e.g., one or more functions of the base station 202 as described herein). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
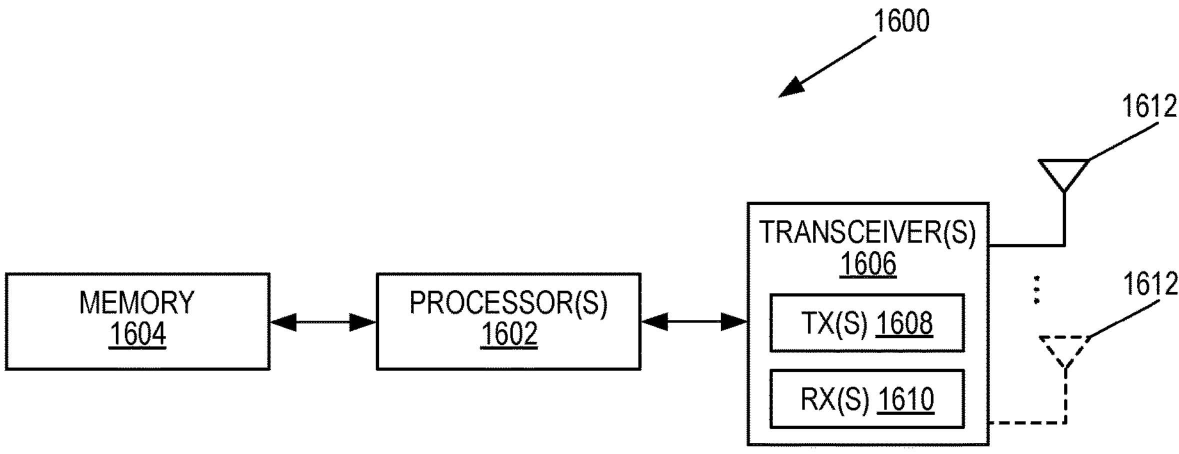
FIG. 16 is a schematic block diagram of a User Equipment device (UE) according to some embodiments of the present disclosure.

FIG. 16 is a schematic block diagram of a WCD 1600 according to some embodiments of the present disclosure. The WCD 1600 may be, for example, one of the WCDs 204 as described herein. As illustrated, the WCD 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the WCD 1600 described above (e.g., one or more functions of the WCD 204 as described herein) may be fully or partially implemented in software that is, e.g., stored in the memory 1604 and executed by the processor(s) 1602. Note that the WCD 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the WCD 1600 and/or allowing output of information from the WCD 1600), a power supply (e.g., a battery and associated power circuitry), etc.

In some embodiments, a computer program including instructions which, when executed by at least one processor, causes the at least one processor to carry out the functionality of the WCD 1600 according to any of the embodiments described herein (e.g., one or more functions of the WCD 204 as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
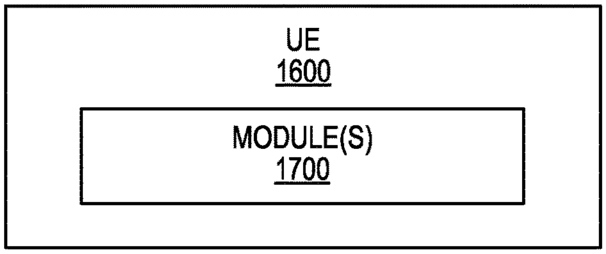
FIG. 17 is a schematic block diagram of the UE of FIG. 16 according to some other embodiments of the present disclosure.

FIG. 17 is a schematic block diagram of the WCD 1600 according to some other embodiments of the present disclosure. The WCD 1600 includes one or more modules 1700, each of which is implemented in software. The module(s) 1700 provide the functionality of the WCD 1600 described herein (e.g., one or more functions of the WCD 204 as described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ASIC Application Specific Integrated Circuit
CPU Central Processing Unit
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
IoT Internet of Things
LTE Long Term Evolution
MTC Machine Type Communication
NR New Radio
RAN Radio Access Network
RRH Remote Radio Head
UE User Equipment Those skilled in the art will recognize improvements and modifications to the embodiments of the present disclosure. All such improvements and modifications are considered within the scope of the concepts disclosed herein.

The invention claimed is:

1. A method performed by a wireless communication device, the method comprising:

obtaining a configuration of a plurality of sets of resources for cooperative uplink transmission, the plurality of sets of resources comprising N sets of resources that are mapped to N possible data elements that can be communicated by the cooperative uplink transmission by a group of two or more wireless devices including the wireless communication device, where N is an integer number that is greater than or equal to 2; and transmitting a transmission using at least a subset of a particular set of resources from among the N sets of resources that is mapped to a particular data element from among the N possible data elements that is to be communicated by the wireless communication device for the cooperative uplink transmission.

2. The method of claim 1 wherein the N sets of resources are different sets of resources.

3. The method of claim 2 wherein each of the N sets of resources consists of a single resource, and transmitting the transmission using the at least a subset of the particular set of resources comprises transmitting the transmission using the single resource in the particular set of resources.

4. The method of claim 2 wherein each of the N sets of resources consists of two or more resources, and transmitting the transmission using the at least a subset of the particular set of resources comprises transmitting the transmission using a resource from among the two or more resources in the particular set of resources.

5. The method of claim 4 further comprising selecting the resource from among the two or more resources in the particular set of resources to be used for transmitting the transmission.

6. The method of claim 5 wherein selecting the resource from among the two or more resources in the particular set of resources to be used for transmitting the transmission comprises:

selecting the resource from among the two or more resources in the particular set of resources to be used for transmitting the transmission based on a device identifier, ID, of the wireless communication device; or randomly selecting the one of the two or more resources in the particular set of resources to be used for transmitting the transmission.

7. The method of claim 4 wherein the two or more resources in the particular set of resources comprise different time resources, or different frequency resources, or both different time resources and different frequency resources.

8. The method of claim 4 wherein the two or more resources in the particular set of resources comprise different subcarriers in an Orthogonal Frequency Division Multiplexing, OFDM, system, or different OFDM symbol periods in the OFDM system, or both different subcarriers and different OFDM symbol periods in the OFDM system.

9. The method of claim 4 wherein:

the N possible data elements are two possible bit values, the N sets of resources are two sets of resources consisting of a first set of resources mapped to a first bit value from among the two possible bit values and a second set of resources mapped to a second bit value from among the two possible bit values; and the first set of resources consists of a first set of frequency resources over a period of time, and the second set of resources consists of a second set of frequency resources over the period of time.

10. The method of claim 4 wherein:

the N possible data elements are two possible bit values, the N sets of resources are two sets of resources consisting of a first set of resources mapped to a first bit value from among the two possible bit values and a second set of resources mapped to a second bit value from among the two possible bit values; and the first set of resources consists of a first set of time resources on a first frequency resource over a period of time, and the second set of resources consists of a second set of time resources on a second frequency resource over the period of time, where the first and second frequency resources are different frequency resources.

11. The method of claim 4 wherein:

the N possible data elements are two possible bit values;

the N sets of resources are two sets of resources consisting of a first set of resources mapped to a first bit value from among the two possible bit values and a second set of resources mapped to a second bit value from among the two possible bit values; and the first set of resources and the second set of resource are defined such that the wireless communication device operates in accordance with a Frequency Shift Keying, FSK, transmission scheme with a frequency deviation that is a multiple of a subcarrier spacing of a multi-carrier based system in which the cooperative uplink transmission is made.

12. The method of claim 1 wherein:

the N sets of resources consist of two sets of resources, where the two sets of resources are the same set of resources; and the N possible data elements consist of a first bit value represented by transmitting on the same set of resources and a second bit value represented by not transmitting on the same set of resources; or wherein the N possible data elements are N unique messages, or wherein the N possible data elements are two possible bit values, and the N sets of resources are two sets of resources.

13. The method of claim 1 wherein the transmission is a predefined signal, the predefined signal being a predefined physical signal or a predefined physical channel.

14. The method of claim 13 wherein the predefined signal is a predefined bit sequence.

15. The method of claim 1 wherein obtaining the configuration of the plurality of sets of resources for cooperative uplink transmission comprises receiving the configuration of the plurality of sets of resources for cooperative uplink transmission from a network node.

16. The method of claim 1 wherein obtaining the configuration of the plurality of sets of resources for cooperative uplink transmission comprises receiving the configuration of the plurality of sets of resources for cooperative uplink transmission from memory or from an associated Subscriber Identity Module, SIM, card.

17. The method of claim 1 further comprising repeating the step of transmitting a transmission in multiple time periods, wherein the set of possible values consists of a logical "0" and a logical "1," and repeating the step of transmitting a transmission in multiple time periods communicates a multiple bit sequence.

18. A wireless communication device for cooperative uplink transmission, the wireless communication device comprising:

one or more transmitters;

processing circuitry associated with the one or more transmitters, the processing circuitry configured to cause the wireless communication device to:

obtain a configuration of a plurality of sets of resources for cooperative uplink transmission, the plurality of sets of resources comprising N sets of resources that are mapped to N possible data elements that can be communicated by the cooperative uplink transmission by a group of two or more wireless devices including the wireless communication device, where Nis an integer number that is greater than or equal to 2; and transmit a transmission using at least a subset of a particular set of resources from among the N sets of resources that is mapped to a particular data element from among the N possible data elements that is to be communicated by the wireless communication device for the cooperative uplink transmission.

19. A method performed by a network node, the method comprising:

providing, to a plurality of wireless communication devices, information that configures the plurality of wireless communication devices for cooperative uplink transmission, wherein the information comprises information that defines a plurality of sets of resources for the cooperative uplink transmission, and the plurality of sets of resources comprise N sets of resources that are mapped to N possible data elements that can be communicated by the cooperative uplink transmission, where N is an integer number that is greater than or equal to 2; and detecting the cooperative uplink transmission based on signals received in at least one of the N sets of resources.

20. A network node comprising processing circuitry configured to cause the network node to:

provide to a plurality of wireless communication devices information that configures the plurality of wireless communication devices for cooperative uplink transmission, wherein the information comprises information that defines a plurality of sets of resources for the cooperative uplink transmission, and the plurality of sets of resources comprise N sets of resources that are mapped to N possible data elements that can be communicated by the cooperative uplink transmission, where N is an integer number that is greater than or equal to 2; and detect the cooperative uplink transmission based on signals received in at least one of the N sets of resources.

* * * * *